Sept. 22, 1964   L. E. AUSTIN ETAL   3,149,736
TOTE BOX HANDLING MECHANISM
Filed Aug. 21, 1957   13 Sheets-Sheet 5

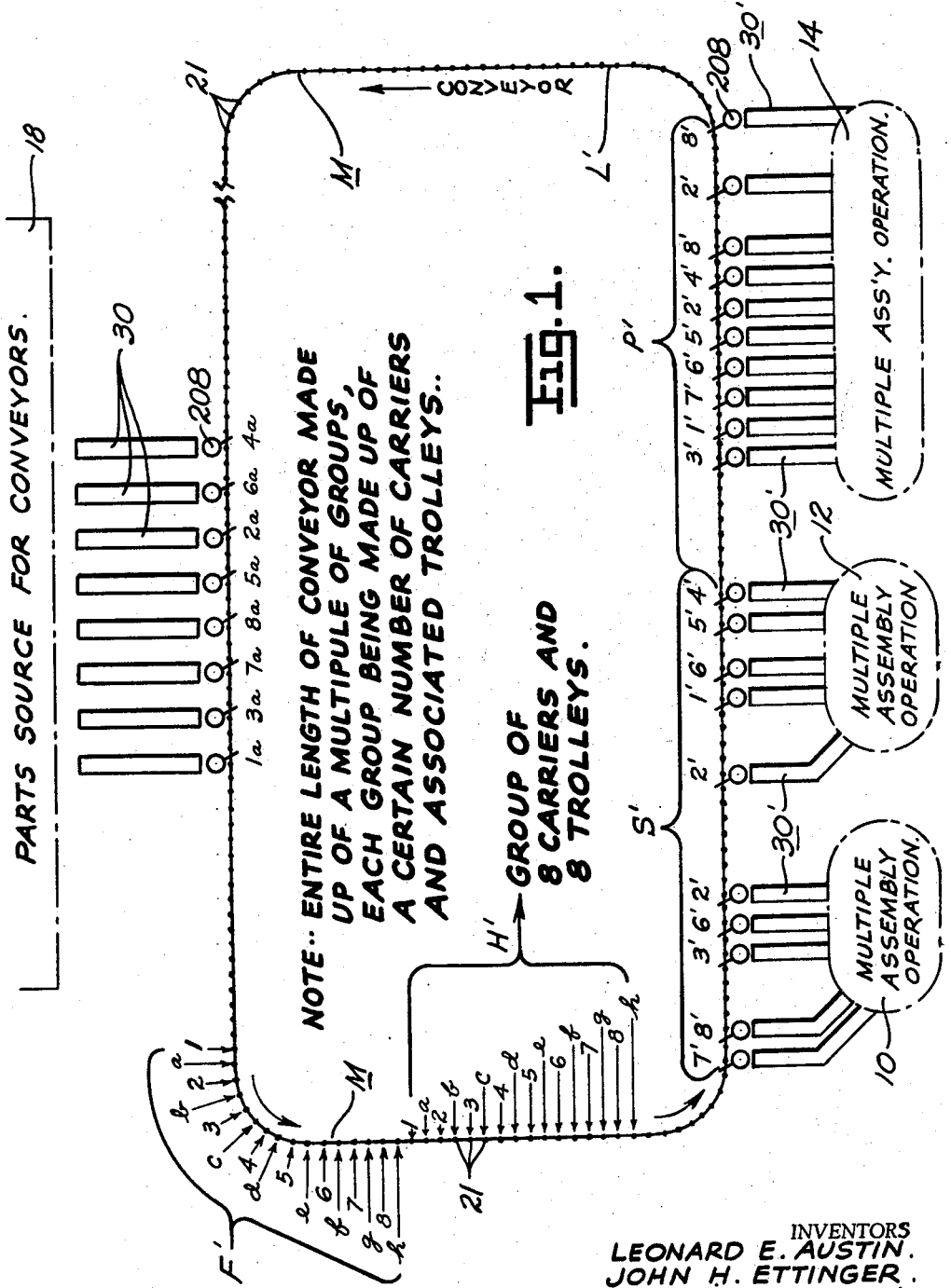

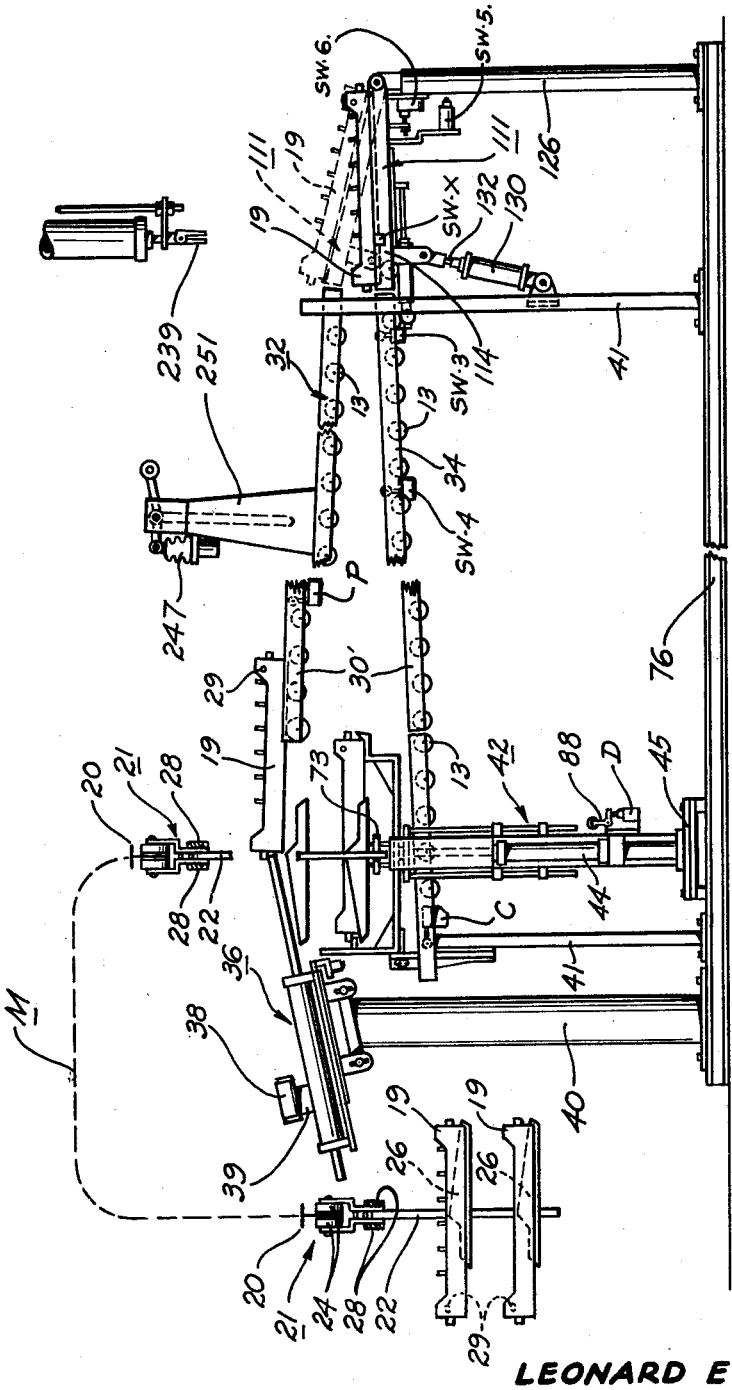

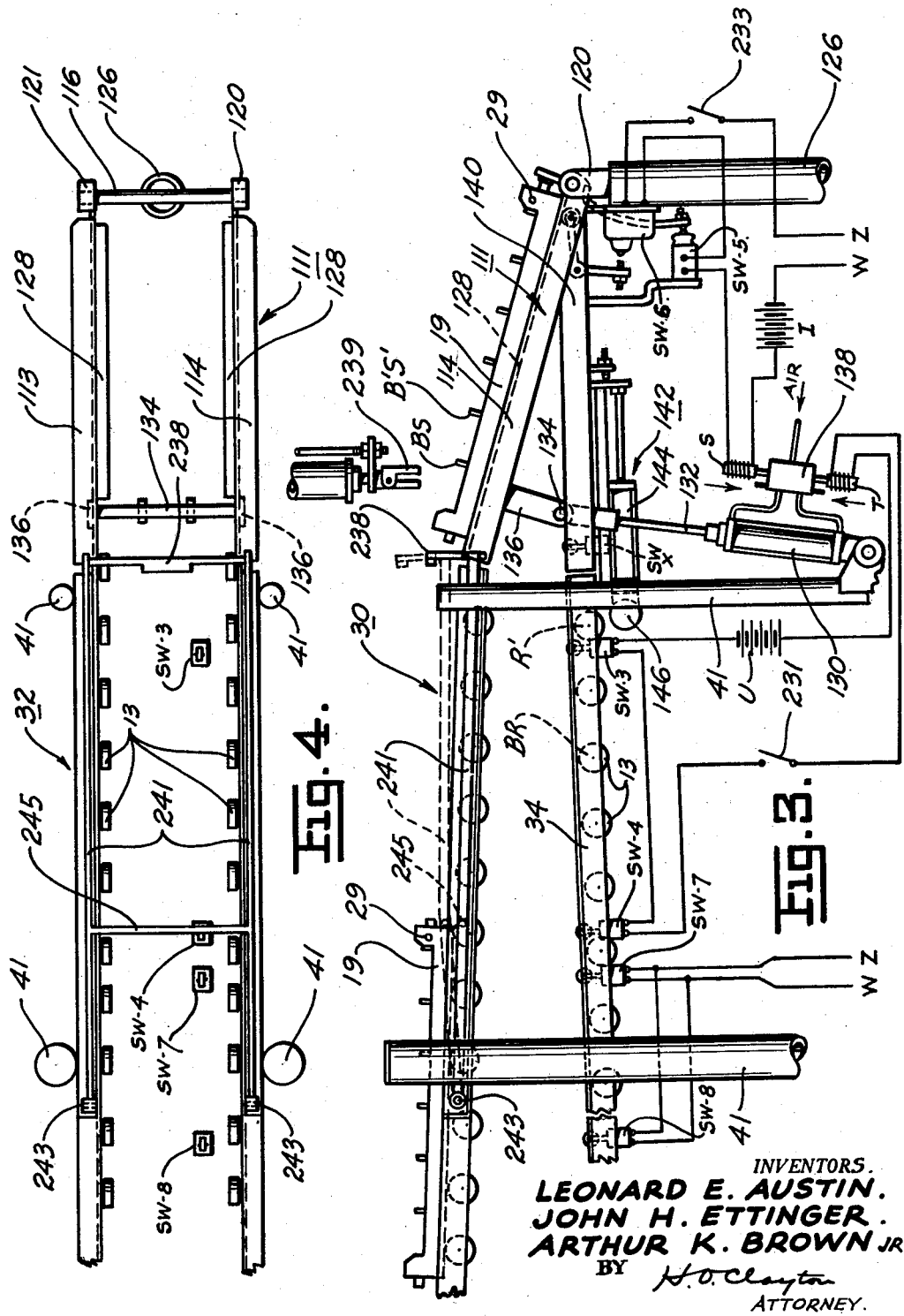

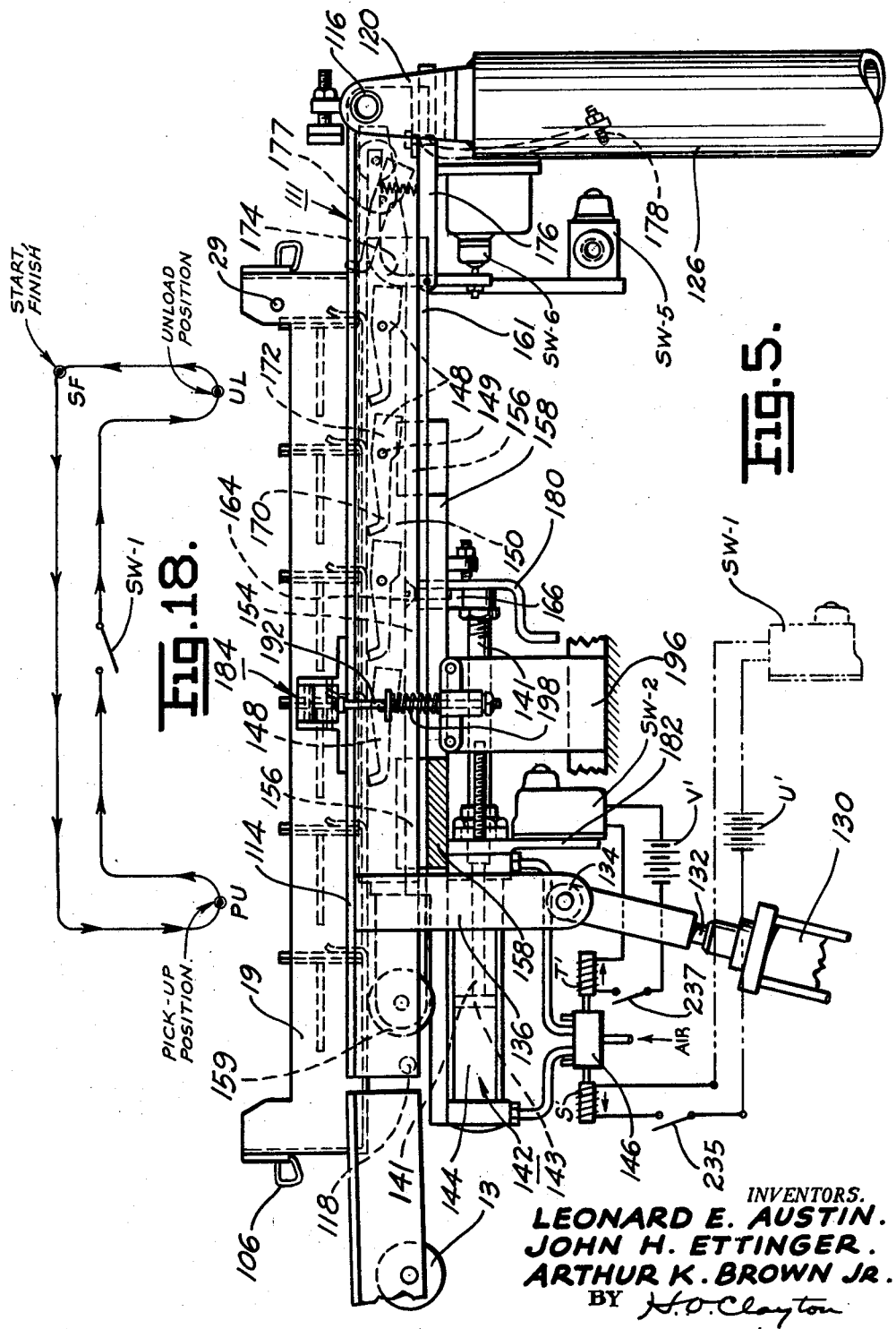

INVENTORS.
LEONARD E. AUSTIN.
JOHN H. ETTINGER.
ARTHUR K. BROWN JR.
BY H. O. Clayton
ATTORNEY.

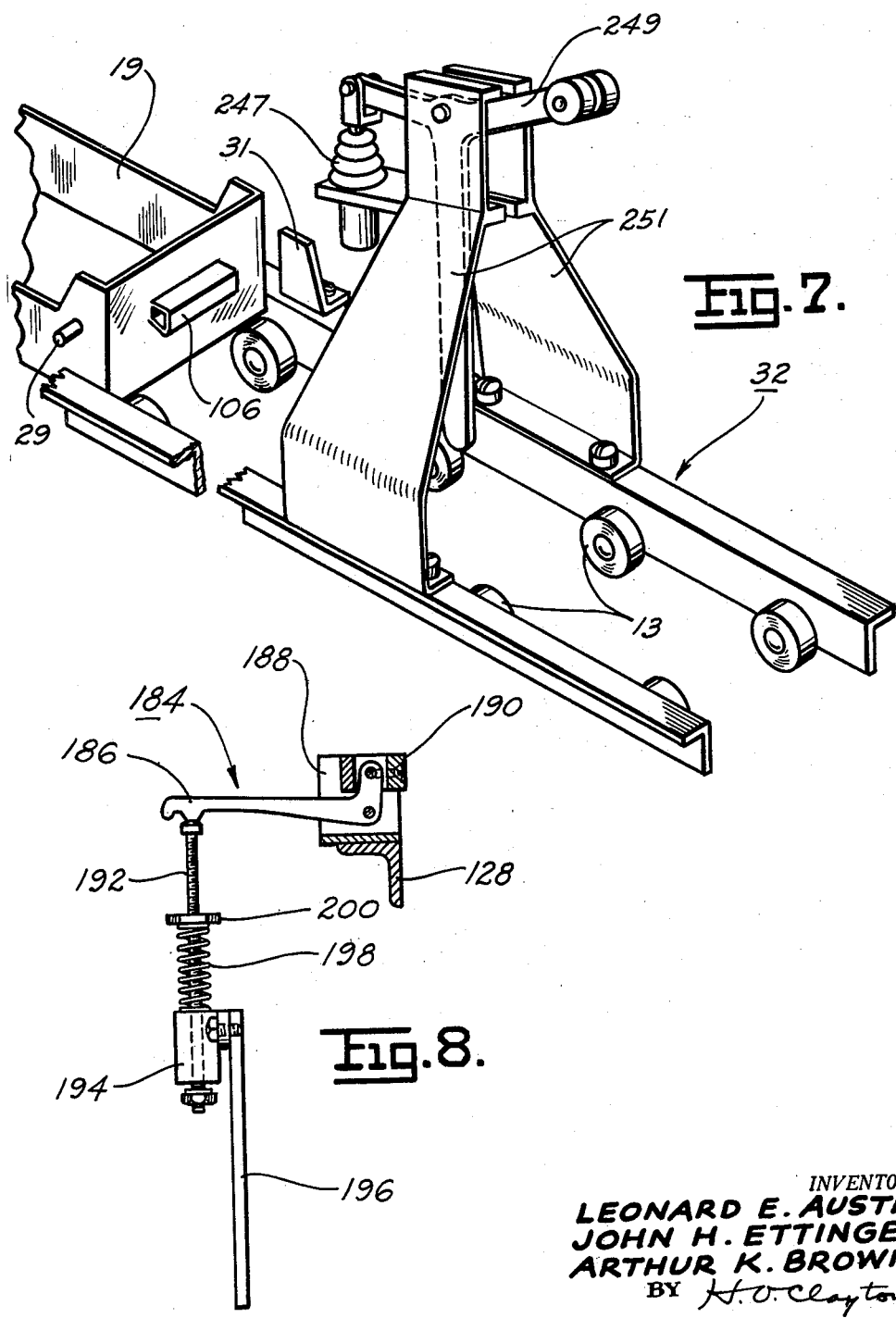

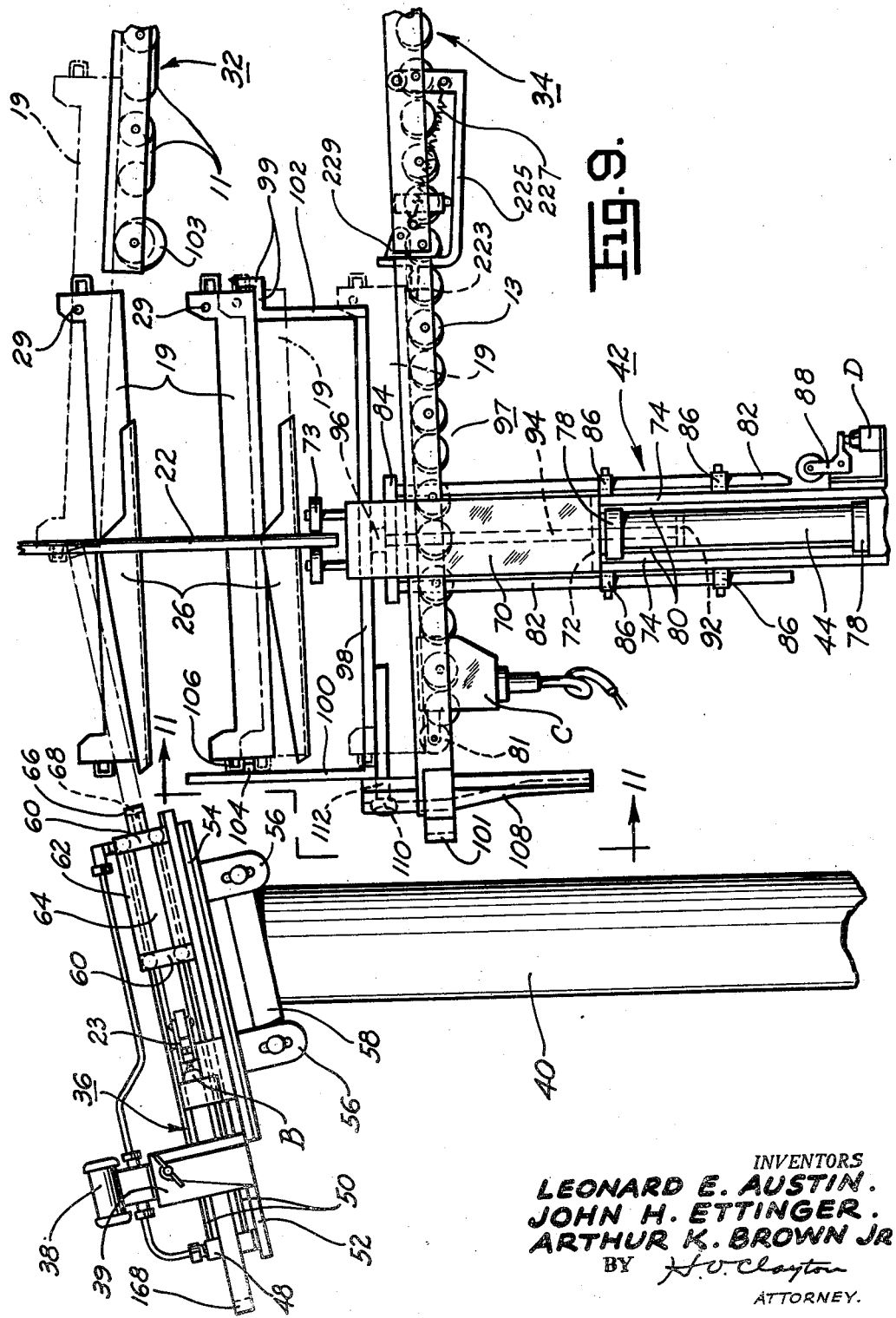

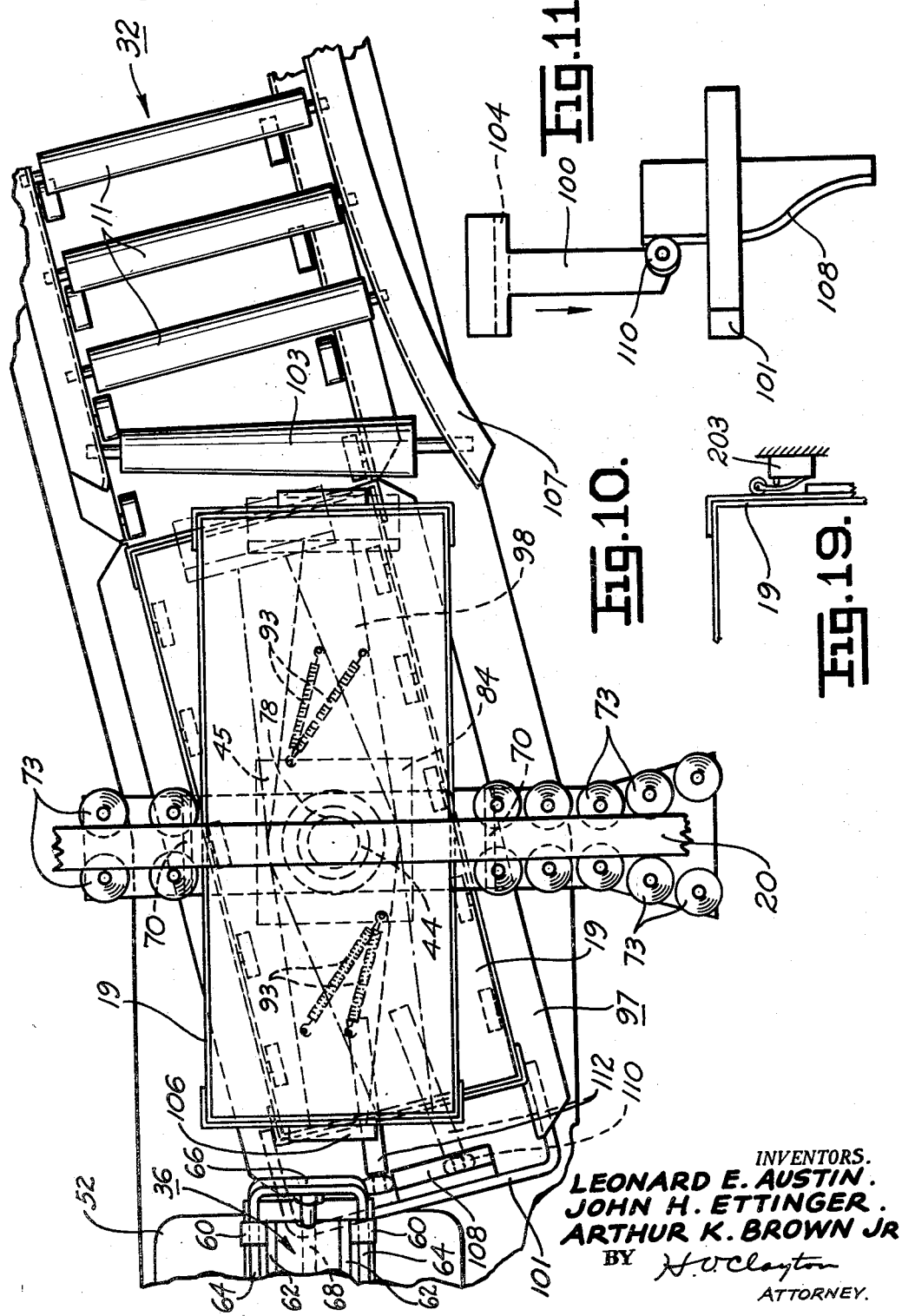

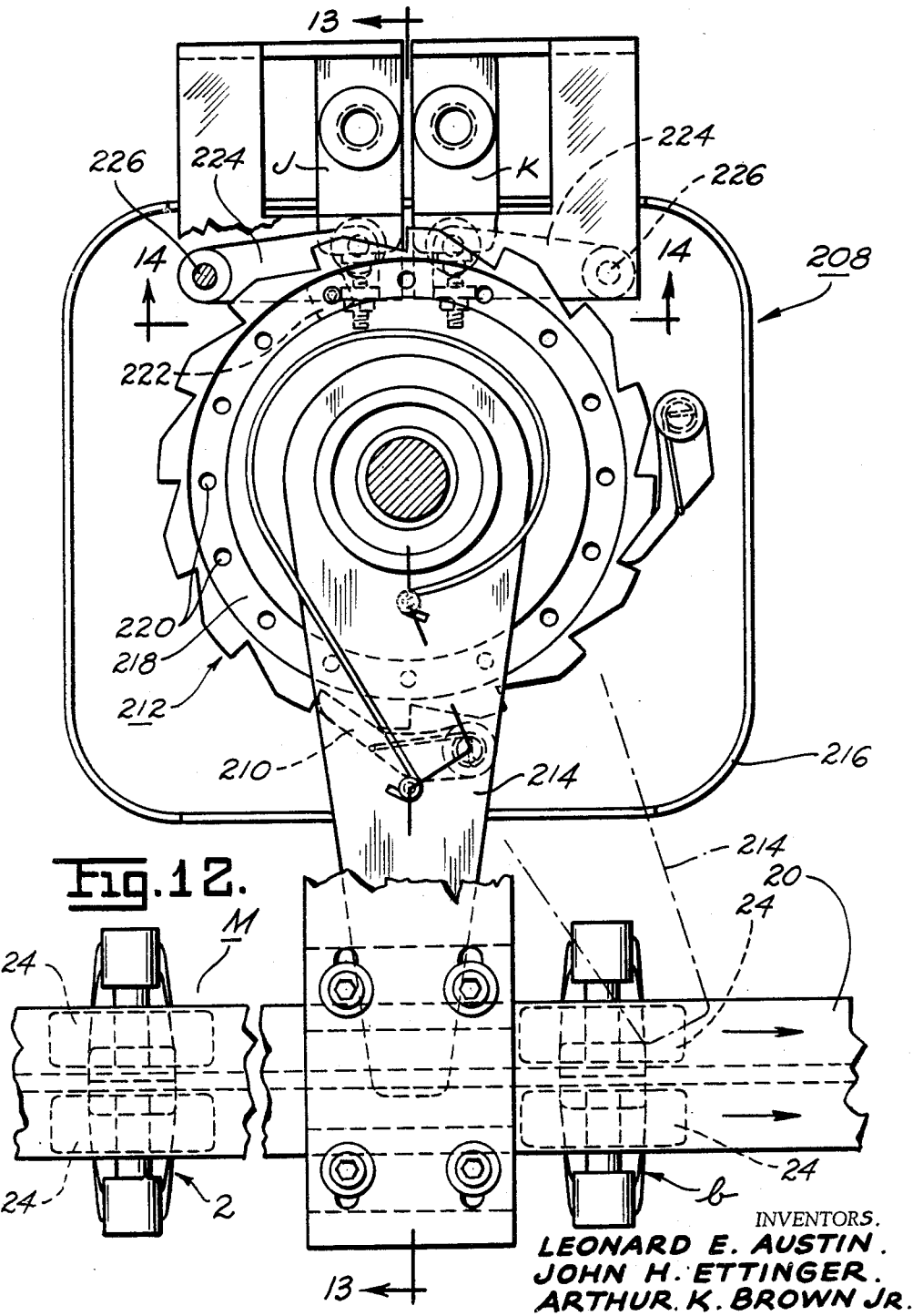

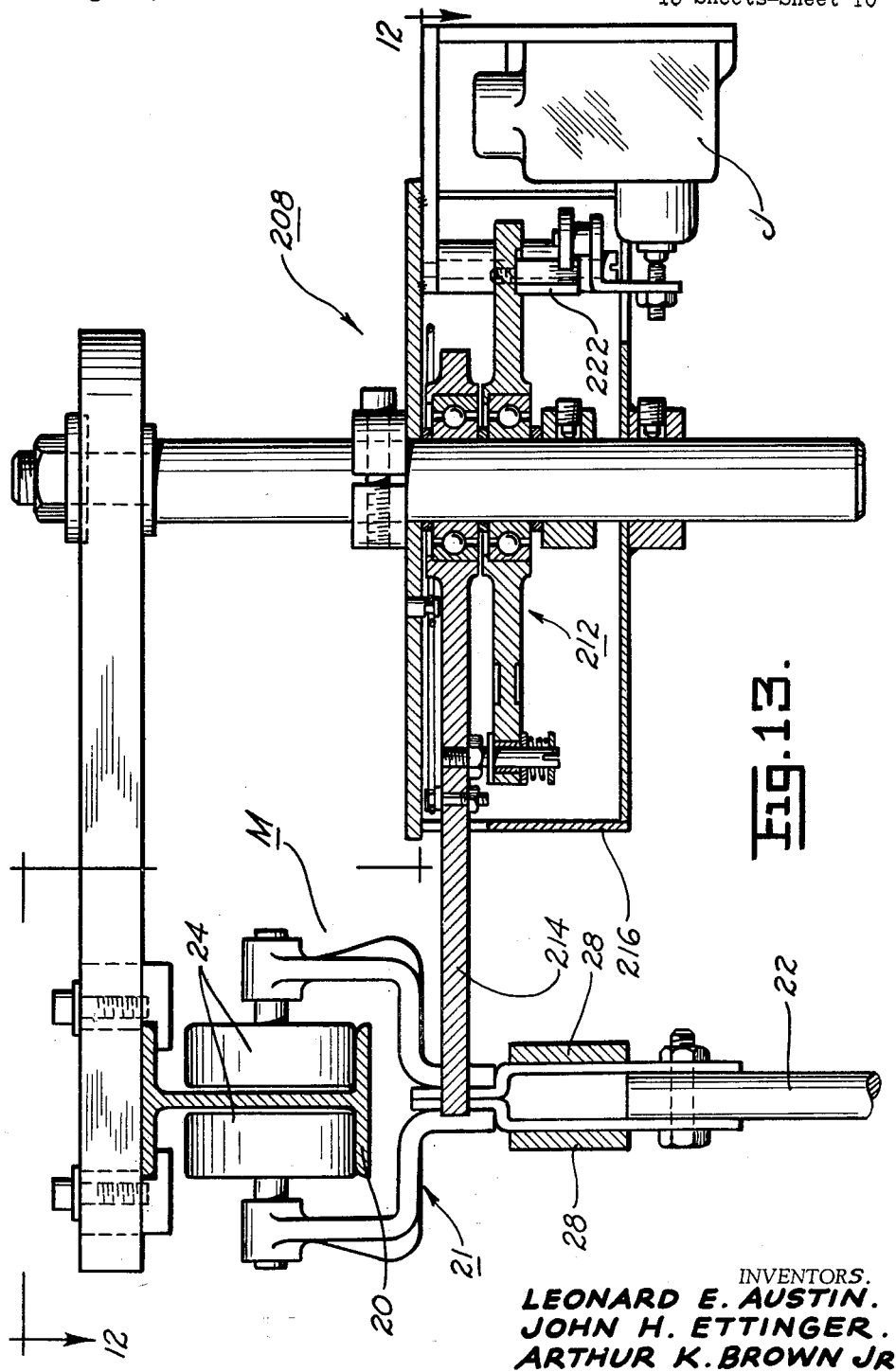

INVENTORS.
LEONARD E. AUSTIN.
JOHN H. ETTINGER.
ARTHUR K. BROWN JR.
BY H.V.Clayton
ATTORNEY.

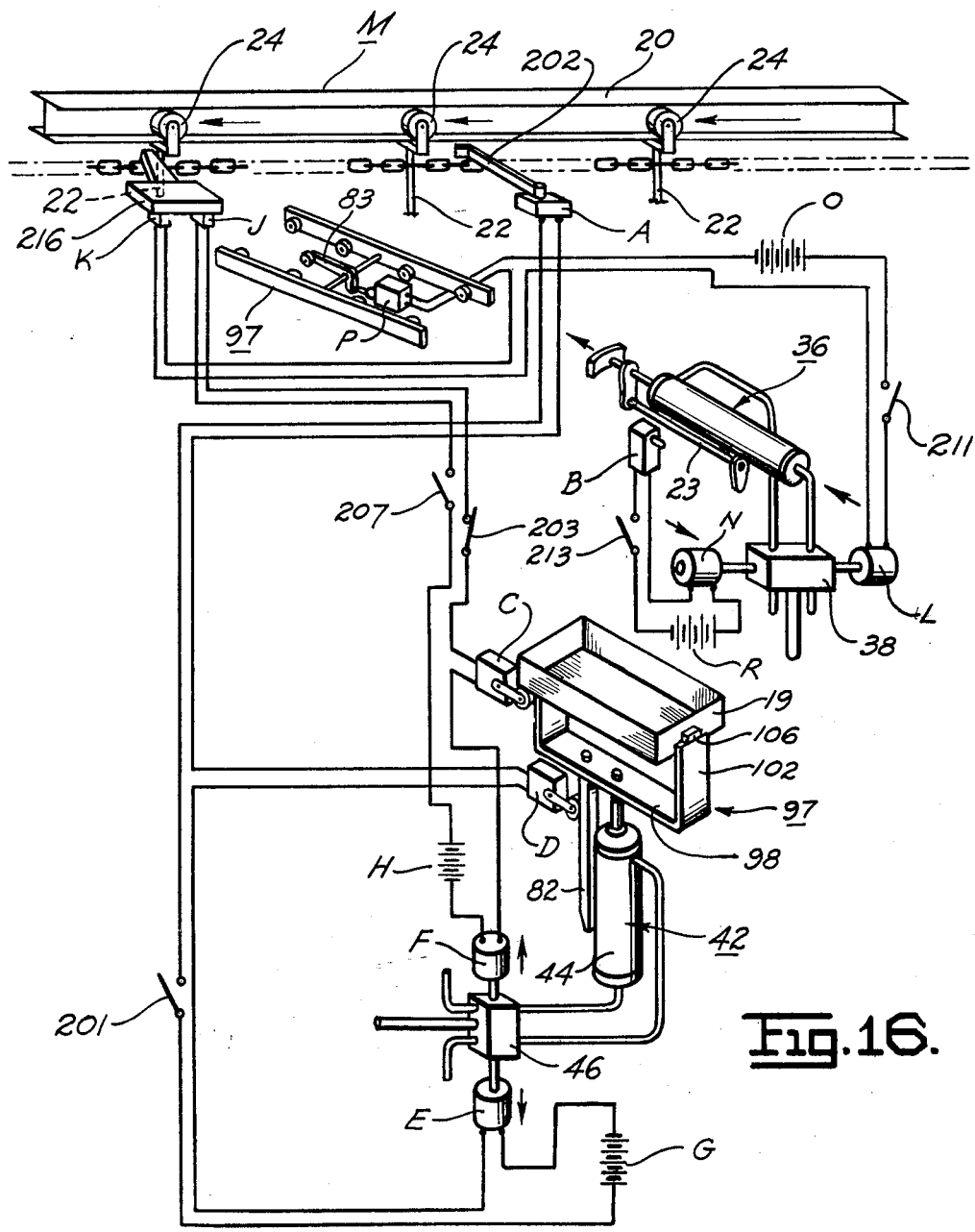

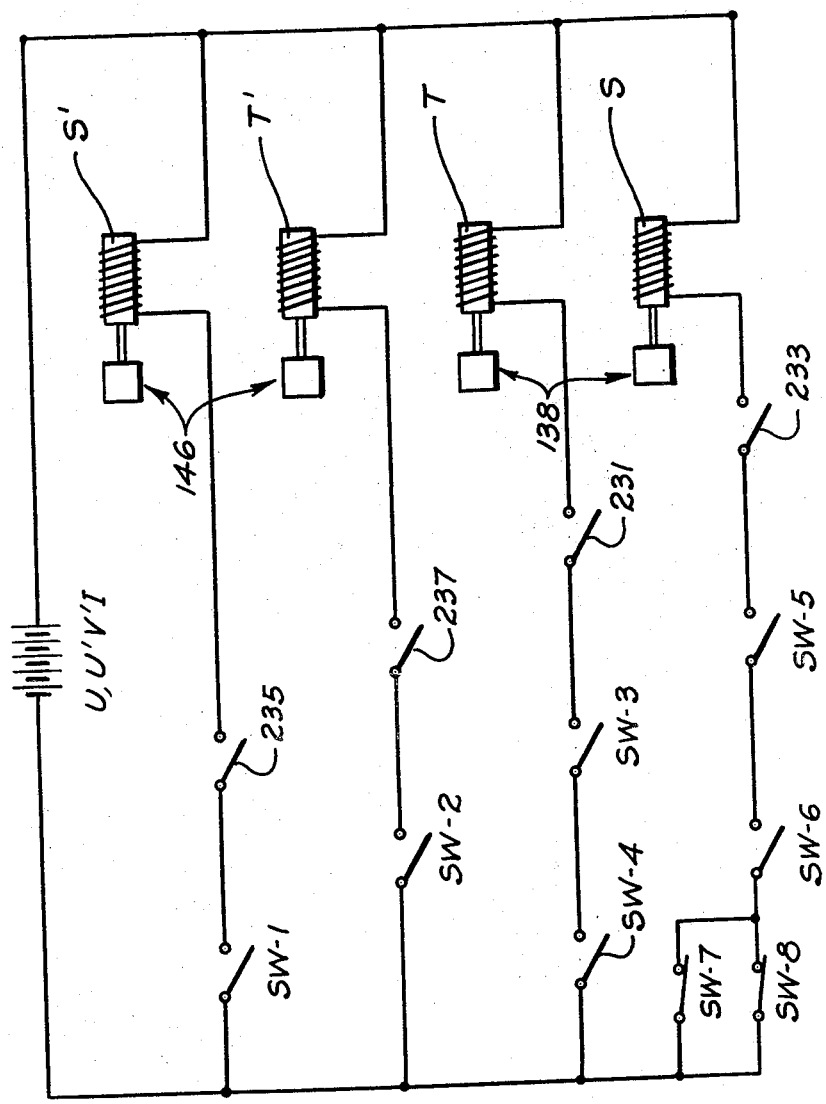

3,149,736
TOTE BOX HANDLING MECHANISM
Leonard E. Austin, John H. Ettinger, and Arthur K. Brown, Jr., South Bend, Ind., assignors to The Bendix Corporation, a corporation of Delaware
Filed Aug. 21, 1957, Ser. No. 679,429
12 Claims. (Cl. 214—89)

This invention relates in general to a mechanism for facilitating the assembly of parts of one or more different units, for example automotive brake units, into its or their whole; and in particular our invention relates to tote box handling mechanism cooperating with a mechanism for assembling, to make up the aforementioned whole unit or units, the parts of said unit or units being carried by said tote boxes. Our invention also, in a broad sense, relates to a power operated mechanism for transporting from a source of supply to a certain destination and in a certain order, a plurality of different articles being processed.

Now to effect the desired feeding into the assembly mechanism of the parts of the units being assembled, particularly irregularly shaped parts adapted to fit within specially shaped tote boxes but not capable of being fed from a hopper by gravity, it is desirable to provide tote box handling means having parts operable in a certain order or, in other words, sequence, to feed to the assembly mechanism the several parts of the units being assembled; and with our invention this is accomplished by the provision of a plurality of two-part gravity type tote box transporting roller conveyors cooperating with the assembly mechanism and with a plurality of tote box handling loader, unloader units, said units, which may be sequentially operable, cooperating with a monorail type of conveyor for transporting the tote boxes from place to place.

A portion of the above described mechanism constituting an important feature and object of our invention lies in the provision of a two-part tote box handling gravity type roller conveyor mechanism receiving, at one end thereof by the operation of a power operated loader mechanism, its full tote boxes, and relieved of its empty tote boxes at said end of the conveyor mechanism by the operation of a power operated unloader mechanism; together with power operated means, operative at the other end of the conveyor mechanism, to empty the full tote boxes of the parts therein, one at a time, and also operative to manipulate the full and empty tote boxes to facilitate this emptying operation.

Yet another object of our invention is to provide, in combination with a monorail type of conveyor adapted to transport from place to place like groups of tote boxes the boxes of each group being positioned in a certain order and carrying different parts of a unit to be assembled and there being a different part in each box of the group, a power operated mechanism for assembling said parts into said units, a source for supplying said parts, a gravity type roller conveyor means for transporting said tote boxes, when full of parts, from the supply source to the monorail conveyor and for transporting empty tote boxes from the latter conveyor to said source there to be refilled by hand; and other gravity type roller conveyor means, duplicating the aforementioned roller conveyor means, for transporting, from the monorail conveyor to the assembly mechanism, tote boxes carrying said parts and for transporting, from a place near the assembly mechanism to said monorail conveyor means, empty tote boxes; together with power operated two-part loader, unloader units, which may be sequentially operable, for effecting the transfer of said boxes to and from the two conveyor means.

Another object of our invention is to include, in each of the aforementioned loader, unloader units, electropneumatic controls therefor, operative, in cooperation with a gravity type roller conveyor mechanism and a monorail type conveyor mechanism, to successively effect first, an operation of one of the two parts of the unit, and then, immediately thereafter, an operation of the other part of the unit.

A further object of our invention is to provide a mechanism for handling full and empty parts carrying containers such as tote boxes, said mechanism including an endless conveyor adapted to transport said boxes from place to place, and a plurality of roller type gravity operated conveyors mounted adjacent said endless conveyor; together with means, operative in a certain sequence and operative to effect a certain positioning of the parts on each of like groups of carriers on the endless conveyor, for transferring full tote boxes from certain of said gravity operated conveyors to said endless conveyor and transferring empty tote boxes from the latter conveyor to said gravity operated conveyors, and other means, which may at times be sequentially operative in a sequence different from the aforementioned sequence, for transferring empty tote boxes from certain of said gravity operated conveyors to said endless conveyor and transferring full tote boxes from the endless conveyor to the latter gravity operated conveyors.

A further object of our invention is to provide, in combination with a plurality of gravity type roller conveyors and a monorail conveyor including a plurality of like groups of carriers and trolleys the carriers of each group handling a certain number of different parts being processed, a plurality of loader, unloader units constituting a certain group and operable, in a certain sequence, to handle said parts in cooperation with a certain group of the gravity type roller conveyors; together with another group of loader, unloader units operable in accordance with the requirements of an assembly mechanism receiving said parts and cooperating with a certain other group of the gravity type roller conveyors.

Other objects of our invention, including the provision of a monorail type of conveyor cooperating with a loader, unloader mechanism to load and unload full and empty tote boxes at different heights, the provision of safety mechanisms in the controls to insure the desired operations, and the provision of a tote box constructed to accommodate the aforementioned irregularly shaped parts and facilitate their removal, will become apparent from the following detailed description of an illustrative embodiment of our invention, taken in conjunction with the accompanying drawings illustrating said embodiment, in which:

FIGURE 1 is a diagrammatic layout of the tote box handling mechanism of our invention;

FIGURE 2 is a side elevation disclosing the principal parts of the mechanism of our invention;

FIGURE 3 is a side elevation disclosing the principal parts of the tote box manipulating mechanism of our invention;

FIGURE 4 is a top plan view of the mechanism of FIGURE 3;

FIGURE 5 is a side elevational view disclosing the elevator with its tote box moved to a position to place said box on the table of the tote box pusher mechanism;

FIGURE 7 is a view disclosing, in perspective, the mechanism of our invention for slowing up the tote pans as they move down the conveyor;

FIGURE 8 is a sectional view, taken on the line 8—8 of FIGURE 6 disclosing details of the brake for the tote box pusher mechanism of FIGURE 5;

FIGURE 9 is an end elevational view of the loader, unloader mechanism of our invention, shown in cooperation with a portion of a carrier of the endless conveyor of said mechanism;

FIGURE 10 is a plan view of the elevator portion of the unloader mechanism of our invention, shown in cooperation with portions of a conveyor and the motor for pushing a tote pan off of said elevator;

FIGURE 11 is a view, taken on the line 11—11 of FIGURE 9, disclosing the principal elements of the cam mechanism for changing the alignment of the elevator during its upward movement;

FIGURE 12 is a sectional view, taken on the line 12—12 of FIGURE 13, disclosing the principal elements of the counter unit of our invention; in combination with a trolley $b$ and a carrier 2 for actuating said unit;

FIGURE 13 is a sectional view, taken on line 13—13 of FIGURE 12, disclosing details of the aforementioned counter unit; together with a carrier for actuating said unit;

FIGURE 16 is a diagrammatic view disclosing the principal elements of the loader, unloader unit of our invention; and the controls therefor;

Figure 6:
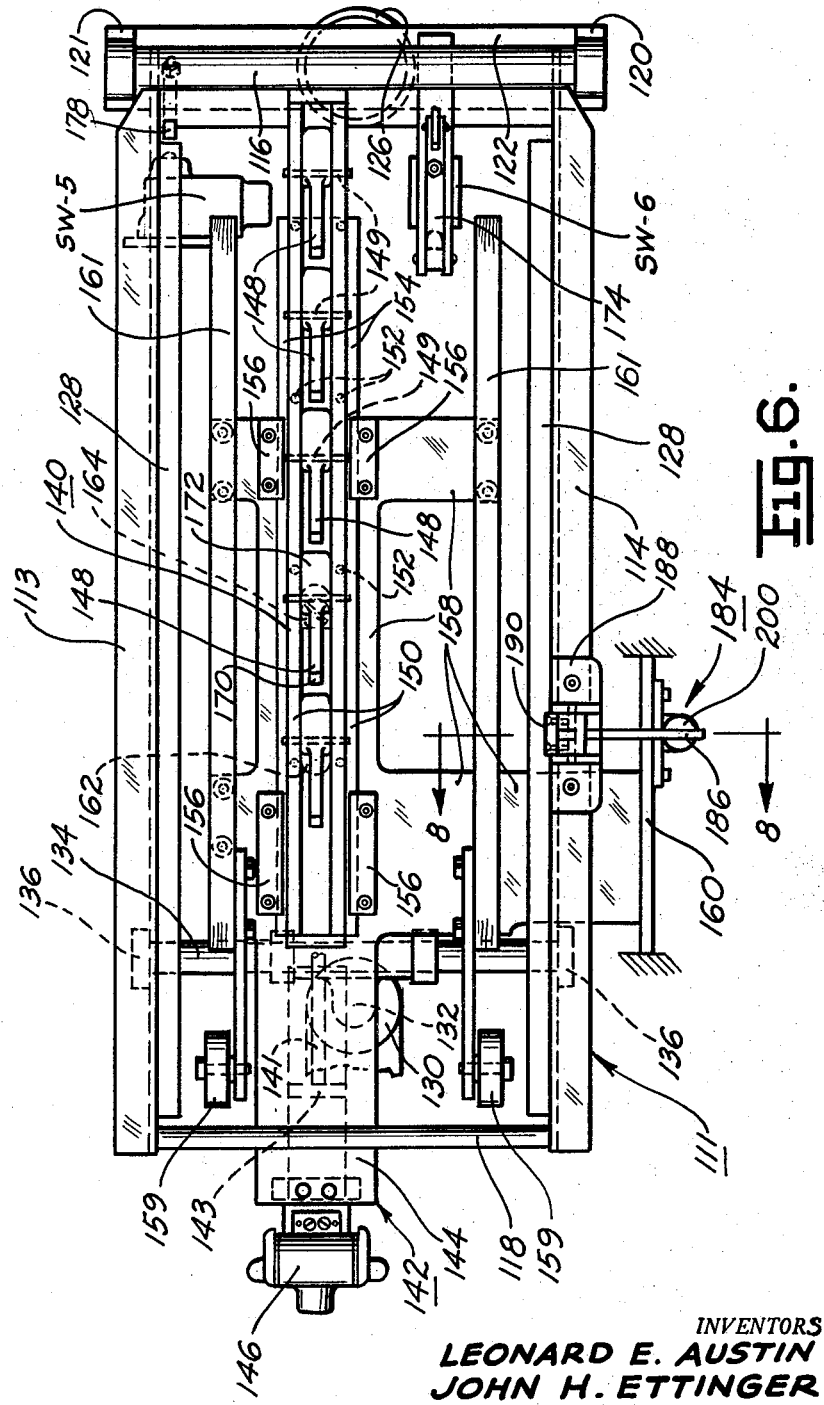
FIGURE 6 is a plan view of the mechanism of FIGURE 5.

FIGURE 17 diagrammatically discloses the electrical hookup of the principal controls of the tote box manipulating mechanism of FIGURES 3 to 6 inclusive;

FIGURE 18 is a diagrammatic view disclosing, in a general way, the path of movement of the brake shoe pickup claw 239 of FIGURES 2 and 3; and FIGURE 19 is a diagrammatic view disclosing the safety switch 203 and a full tote box 19 which actuates said switch.

There is disclosed in FIGURE 1 a preferred embodiment of our invention for handling full and empty containers, such as tote boxes. In this embodiment a plurality of assembly mechanisms 10, 12 and 14 are employed, each mechanism serving to assemble, into a certain type of unit, the parts of said unit. This unit may for example, be an automotive brake of a certain type, say a Ford brake; and since there are three different assembly mechanisms, there would, in the mechanism of FIGURE 1, be three different types of brake units made up. However, my invention is not limited to a plurality of assembly mechanisms; for there may be but one of said mechanisms.

Describing now the tote box handling mechanism for feeding the assembly mechanisms 10, 12 and 14, a monorail type of conveyor mechanism M, of any well known type, serves to transport, from a source of supply 18 to the assembly mechanisms, the several tote boxes which carry the parts of the units being assembled. As indicated by the dots on a line L' and by the legends in FIGURE 1, the monorail conveyor mechanism M is preferably completely filled with a plurality of groups of carriers and trolleys, the carriers of each group alternating with the trolleys of said group and being numbered from 1 to 8. Each carrier of the group handles a certain article of manufacture, say a brake shoe of a certain mechanism. Two of the trolley, carrier groups, lettered F' and H', are shown in FIGURE 1. These articles of manufacture are carried by tote boxes mounted on the carriers, said boxes being indicated by the reference numeral 19 in the several figures of the drawings. Thus with say 20 groups the conveyor M will, with one revolution of the conveyor process 20 of each of the different articles, or, better described, parts being assembled by the assembly machines 10, 12 and 14. The carriers 1 to 8 inclusive and the trolleys spacing them are mounted on a permanently supported I-beam shaped endless rail 20, FIGURE 13, and each carrier preferably includes a trolley 21 having rollers 24 mounted on its U-shaped upper end and a hanger member 22 mounted on its lower end. A two-part basket member 26, FIGURE 2, is mounted on the hanger. A so-called trolley member, duplicating in construction the trolley 21 of the carriers but having no basket secured thereto, is placed between each carrier member said trolleys being indicated by the letters $a$ to $h$ inclusive, FIGURE 1. The several carriers and trolleys are preferably equidistantly, or substantially equidistantly spaced apart and said members are moved around the track, that is the I-beam, by means of an endless power driven chain 28. The motor for driving this chain is not disclosed in the drawings.

In the embodiment of our invention disclosed in the drawings, particularly FIGURE 1 thereof, a plurality of spaced apart two-part gravity type roller conveyor units are positioned normal to the monorail conveyor M and eight of said units, indicated by the reference numeral 30 and mounted adjacent the source of supply 18, cooperate with a plurality of identical loader, unloader units, indicated by the numbered circles $1a$ to $8a$ inclusive, in the operation of loading empty tote boxes onto the latter conveyor units and unloading full tote boxes therefrom.

In the particular embodiment of our invention disclosed in FIGURE 1, 20 of the roller conveyor units, indicated by the reference numeral 30', cooperate with a plurality of identical loader, unloader units indicated by the reference numerals 1' to 8' inclusive, in loading onto and unloading from said conveyor units full and empty tote boxes respectively. The roller conveyor units 30 and 30' duplicate each other and each includes an upper portion 32, FIGURE 3, and a lower portion 34; and each of said portions include the usual spaced apart angle iron side rails having spaced apart tote box supporting rollers 13 mounted thereon; and at the upper end of the portion at 32 rollers 11 are mounted on said side rails. The portions 32 and 34 of the units 30' are inclined as indicated in FIGURES 2 and 3 and the inclination of the corresponding parts in the units 30 is just the reverse. As to the source of supply 18, empty tote boxes received by said source from the conveyor units 30 are preferably filled by a factory worker whereupon said worker then properly places the boxes in the conveyor units 30 to be returned to the conveyor M; and it is to be noted that each of these 8 conveyor units 30 adjacent the supply source is made up of two parts, a part handling the empty tote boxes to be refilled and a part in juxtaposition therewith handling the filled tote boxes. Should the worker incorrectly position the tote box in the conveyor portion 32, then a pin 29, FIGURE 7, extending from one side of the tote box, will strike a stop 31 on said portion 32 to prevent a movement of said box.

As described above, the monorail conveyor M is preferably completely filled up with a plurality of like groups of carriers and trolleys, and each group numbers 8 carriers and 8 trolleys; and every carrier of each group processes a different part to be assembled. Now as will be described hereinafter the mechanism of our invention is such that the 8 carriers of each group, as they pass the source of supply 18 in the direction of the arrow, FIGURE 1, are successively and in a certain sequence, loaded with full tote boxes and unloaded of their empty tote boxes as they pass the several loader, unloader units they are set to cooperate with; for example loader, unloader $8a$ cooperate with its mating carrier 8 in the group of 8 carriers; loader-unloader $2a$ with its mating carrier 2 in each group, loader, unloader $3a$ with 3, etc. The filled carriers are then, when they reach the area of the twenty loaders, unloader mechanisms numbered 1' to 8' inclusive, successively and at times in a certain sequence, loaded with empty tote boxes and unloaded of their full tote boxes as they pass the several loader-unloader units they are set to cooperate with. For example loader-unloader 8' will cooperate with its mating carrier 8 in each group of carriers; loader-unloader 2' with its mating carrier 2 in each group, loader, unloader 3' with 3, etc.

The full tote boxes are then transported, by the conveyors 30', to the assembly mechanisms. When the filled tote boxes reach the assembly mechanisms they are automatically emptied of their contents, which contents are then fed into said mechanisms; and the empty boxes are then returned to the conveyor M.

Now the 8 different parts, such as brake shoes, slave cylinders, etc. are used, in the embodiment shown, in the making up of three different brake units, however, these 8 different parts might, of course, be directed to but one assembly mechanism there to be assembled in the making of one type of brake. The assembly mechanisms, which may be of the rotary type indexed from position to position after each particular operation is completed, may receive some of its parts, say relatively small parts such as nuts or bolts, from hoppers, the parts being fed to the mechanisms by gravity; however, it is difficult to gravity feed into the assembly mechanisms relatively large sized parts of irregular shape; accordingly the tote box handling mechanism of our invention has particular virtue in providing a means for feeding to the assembly mechanism or mechanisms, as the case may be, and at the desired time, these irregularly shaped parts.

As stated above, the loader, unloader mechanisms 1a to 8a inclusive and 1' to 8' inclusive of our invention are of the same construction, accordingly, only one of the same will be described. Referring to FIGURES 1, 2, 8, 9, 10 and 16, particularly FIGURES 2 and 16, disclosing this mechanism, the loader portion thereof, that is the portion serving to transfer the filled tote boxes from the monorail conveyor M to the upper portion 32 of a conveyor 30', includes a double acting fluid pressure, preferably air, operated motor 36 controlled by a valve 38. This motor is mounted on a standard 40; and the valve 38 is mounted on a support member 39, FIGURE 9. No claim is made to either the motor or the valve per se, it being sufficient to say that one operation of the valve serves to circuit compressed air to one end of the motor, the opposite end then being vented to the atmosphere; and the other of the two operations of the valve serves to circuit compressed air to the other end of the motor, the opposite end thereof then being vented to the atmosphere. The valve 38, and the other valves referred to herein which duplicate the valve 38, is preferably of the well known type wherein when the valve is moved to effect an energization of its motor said valve remaining in its new position until it is moved again in effecting another operation of said motor. Such motors and valves are well known to those skilled in the art, accordingly, they are not disclosed in detail in this application.

The unloader portion of the loader, unloader unit, that is the portion serving to transfer the empty tote boxes from the lower portion 34 of the conveyor 30' to the lower of the two baskets of the basket member 26, includes an elevator 42, FIGURE 2. This elevator comprises a double acting fluid pressure motor 44, preferably air operated, controlled by a valve 46, FIGURE 16. This valve is not disclosed in either FIGURE 2 or FIGURE 9, however, such a disclosure is not necessary inasmuch as the valve and motor 44 are well known as stated above. As disclosed in FIGURE 2, the motor 44 is mounted on a support 45; and the end portions of the conveyor 30' are mounted on supports 41.

Describing now the aforementioned loader mechanism in greater detail, and referring to FIGURE 9 of the drawings, the motor 36 is mounted, at one of its ends, on a support member 48 and at its other end on a similar member, not shown. Rods 50 surround the motor and are secured, at their ends, to the support members. One of the latter members is shown fixedly mounted on a plate 52 which is fixedly mounted on a plate 54 adjustably secured, by bracket member 56, to a plate 58; and the latter is fixedly mounted on the standard 40. Members 60, FIGURE 9, secured to a plate 62 fixedly mounted on the base plate 52, serve as guide members for bars 64 which are connected together by an end member 66. The motor 36 is provided with the usual piston, not shown, to which is connected a piston rod 68 connected at its outer end to the member 66. When the motor is energized to push a loaded tote box off of the top basket member 26 a switch operating member 23, mounted on the plate 52, is actuated by a portion 168 on the end of the bar 64 to close a normally open switch B, FIGURES 9 and 16. The operation of this switch will be described hereinafter.

Describing the elevator mechanisms of the unloader mechanism in greater detail, a generally U-shaped support member, FIGURE 9, having rectangularly shaped side plates 70 and a rectangularly shaped base plate 72 is mounted on rectangularly shaped plates 74 which are secured to a foundation member 76, FIGURE 2. The motor 44, which is positioned between the plates 74, is secured to a support member 78 there being, as with the motor mount of the motor 36, rods 80 serving to tie the whole, that is motor and supporting structure, together The support member 78 is secured to the plate 72. Rods 82, secured at their upper ends to a rectangularly shaped plate 84, pass through guide members 86 secured to the plates 74. The rods 82 are adapted, at their lower ends, to actuate control switches of the mechanism and, as is disclosed in FIGURE 9, one of said rods actuates a lever 88 which serves to open a normally closed switch D, FIGURES 9 and 16, described hereinafter. This switch is automatically closed when the elevator reaches, or substantially reaches, the top of its stroke, that is up position.

The double acting motor 44 includes a piston 92 which is fixedly connected, by a rod 94, to a spacer member 96 rotatable with respect to the plate 84. The member 96 is fixedly connected to a platform member 98 of the elevator mechanism; and the member 98 is tapered from its center to its ends as disclosed in FIGURE 10. As is disclosed in FIGURE 9, the latter ends of the platform are extended upwardly to provide rectangularly shaped end members 100 and 102, the latter being turned outwardly and then upwardly at 99 to provide a seat for one end of a tote box 19. The end member 100 is provided with a laterally extending ledge member 104 which supports the other end of the tote box when said box is being carried upwardly by the elevator. In this operation the ledge member 104 contacts a flange 106 extending from one end of the tote box or other tray being processed. One end of the upper portion 32 of the conveyor 30 is flanged outwardly at 107, FIGURE 10, and one of the rollers 103 is positioned at an angle with respect to its adjacent roller; and adjacent said end portion there is positioned a conveyor portion 97, FIGURE 10, constituting an extension of the conveyor portion 34. This extension 97 includes angle iron side members secured to and recessed to fit onto the plates 70, all as disclosed in FIGURES 9 and 10; and this extension is provided with roller members to support the tote boxes. The outer ends of the side members of the portion 97 are connected by a cross member 101.

A cam mechanism, FIGURES 9, 10 and 11, including a roller member 110 secured to a support member 112 mounted on the plate 98, and a plate 108 mounted on the cross member 101, operates to turn the elevator portions 98, 100, 102 clockwise, FIGURE 10, against the tension of return springs 93 to one of the dotted line positions thereof; and this operation serves to align the tote box on the elevator with an oncoming carrier. The springs 93 are secured at one of their ends to the member 84 and at their other end to the plate 98. It is to be noted here that this oncoming carrier will pick up the empty tote box elevated by the elevator and then transport it to one of the conveyors 30 adjacent the source of supply 18.

There will now be described the mechanism of our invention for processing the filled and empty tote boxes transported by the two parts of each roller conveyor 30'; and the cooperation of this mechanism with that port of the assembly mechanism which is operative to remove the contents of said boxes. In the embodiment disclosed in this application it is assumed that brake shoes are carried by the tote boxes; accordingly the mechanism referred to hereinafter is designed to remove this particular article. Since the tote boxes of the other conveyors 30' carry seven other different articles it follows that other types of removal mechanisms may be employed.

Referring to FIGURES 2 to 6 inclusive, the brake shoe tote box processing mechanism, which may also be described as a tote box manipulating mechanism, includes a rectangularly shaped elevator member 111 operable to receive a full tote box from the lower end of the upper part 32 of the conveyor 30', then lower said box to the level of the lower part 34 of the said conveyor, and then, after emptying said box of its contents, return the same to its uppermost position to receive another full tote box. As to the structure of this elevator member, the same comprises angle iron side members 113 and 114, a tubular shaped end member 116 secured to the latter members, and an end member 118 interconnecting the members 113 and 114. The tubular shaped end member 116 is pivotally mounted on flanges 120 and 121 extending from a rectangularly shaped plate 122, FIGURE 6, mounted on a standard 126, FIGURE 5. Members 128, extending coextensively with the angle iron side members 113 and 114 and secured thereto, serve as supports for a tote box resting on the elevator. The pivotally mounted elevator 111 is raised and lowered by a double acting fluid pressure, preferably air, elevator motor 130 whose piston, not shown, is connected by a rod 132 with a rod 134 extending crosswise of the elevator. This rod is pivotally connected at its ends with thrust members 136 which are connected at their upper end with the members 113 and 114. The motor 130 is controlled by a valve 138. As referred to above no claim is made to the motor and valve per se, and the operation of these elements will be described hereinafter.

As disclosed in FIGURES 2 and 3, the motor 130 is operable to raise the elevator 111 to a position where one end thereof is flush with the lower end of the conveyor part 32; and said motor is also operable to lower said elevator 111 when carrying a full tote box, to a position to rest said box upon a table member 140, FIGURE 6, of a tote box pusher mechanism indicated as a whole by the reference numeral 142, FIGURE 3. This pusher mechanism, in addition to the table member 140, includes a double acting fluid pressure, preferably air, pusher motor 144 controlled by a valve 146, no claim to which is made. The piston 143 of this motor is connected to a rod 141; and this rod is adjustably connected to a post 166. As disclosed in FIGURES 5 and 6, the tote box pusher mechanism includes a plurality of ratchet members 148 pivotally mounted at 149 upon two spaced apart rail members 150 extending parallel with each other. These rail members are secured, by suitable fastenings 152, to a plate 154 which is slidable in guide members 156 secured to an irregularly shaped fixedly mounted base plate 158. The plate 158 is secured to a standard 160; and to this plate there is secured roller members 159 mounted on tote box support members 161 which are secured to the base plate 158. A screw 164, mounted in the plate 154 and slidable in a slot 162 in the base plate 158, serves to interconnect the plate 154 and a post 166. This post is connected to the piston rod 141 which is connected to the piston 143 of the motor 144. The ratchet members 148 each includes an arm portion 170, FIGURE 5, and a relatively heavy end portion 172, the latter serving to bias the end 170 upwardly as shown by the ratchet member 148 at the extreme right end in this figure.

Describing other features of the mechanism of FIGURES 5 and 6, a curved switch operating member 174, pivotally mounted on a post 176 secured to the member 116, serves, when rotated clockwise, FIGURE 5, against the tension of a spring 177, to make possible the closing of a switch SW-6, said switch being of the normally closed type; a normally open switch SW-5, mounted on the member 161, is closed by a switch operating member 178 when the elevator is in its up position; for the member 178 is so secured to the member 116 that when the elevator is rotated to its uppermost position the member 178 moves angularly clockwise, FIGURE 5, to close the switch SW-5. Another feature of the mechanism of FIGURE 5 lies in an irregularly shaped switch operating arm 180 secured to the post 166. This member is shaped to strike the movable switch contact mechanism of a normally open switch SW-2 mounted on a support 182 secured to the base plate 158. The operation of this switch and its purpose in the mechanism will be described hereinafter. Now when the motor 144 is energized to operate to the left in FIGURE 5, the piston rod 141 serves, through the intermediary of the post 166 to which the rod is connected, to move the table member 140 to the left; and with it goes the arm 180 to close the switch SW-2.

Yet another feature of the mechanism of FIGURE 5 lies in a brake mechanism 184 for preventing over travel of the tote box 19, when the same is moved to the left as described above. This brake mechanism, which is disclosed in FIGURES 5, 6 and 8, includes a lever member 186, FIGURE 8, pivotally mounted on a support 188 fixedly mounted on an elevator side member 128. A brake block 190 of suitable friction material is mounted on one end of the lever. The other end of said lever is adapted, when the elevator is sufficiently lowered, to depress a rod 192 yieldably mounted on a support member 194 secured to a support plate 196. As to this yieldable mounting the same comprises a compression spring 198 interposed between the member 194 and a plate 200 secured to the rod 192.

Describing the operation of the brake 184 when the elevator with its full tote box is lowered to place said box on the table 140 one of the side members 128 of the elevator comes into contact with the upper end of the spring loaded rod 192; and as this rod moves down a bit against the resistance of the spring 198, the lever is rotatable clockwise, FIGURE 8, to bring the friction block 190 into contact with one of the sides of the full tote box 19. There is thus provided drag means for resisting the leftward movement of the tote box when said box is pushed, that is indexed, to the left by a subsequent operation of the motor 144; accordingly, the brake 184 provides a means for preventing an inertia operated over travel of the tote box, and for holding said box in the positions to which it is placed with the forward and backward operations of the motor 144.

There is disclosed in FIGURES 3, 5, 17 and 18 the electrical controls for controlling the operation of the mechanism for manipulating the full and empty tote boxes at the end of the conveyors 30' adjacent the assembly mechanism. As disclosed in FIGURE 3, the elevator motor 130 of these controls is controlled by the valve 138 which is in turn controlled by solenoids S and T. The solenoid T is electrically connected in series with a cut out switch 231, a battery U, and normally open switches SW-3 and SW-4, the latter being both closed when, and only when, the empty tote box has been fully pushed off of the table 140 and onto the end portion of the conveyor portion 34. There is thus provided control means for effecting an energization of the motor 130 to elevate the elevator 111 after it has ridden itself of its tote box. The solenoid S is electrically connected in series with a cut out switch 233, normally open switches SW-5 and SW-6, and one or the other of normally closed switches SW-7 and SW-8, the latter two switches being wired in parallel with each other in the circuit; accordingly both of the switches SW-7 and SW-8 must be open to disable the solenoid S which controls the elevator down operation of the motor 130. The latter switches, which are preferably spaced apart more than the length of one tote box, are both opened when the conveyor portion 34 is full of empty tote boxes; for this being the case it is desirable to temporarily disable the pusher operation of the motor 144. The electrical leads from the switches SW–7 and SW–8 to the remainder of the controls for the solenoid S are indicated by the letters W and Z in FIGURE 3.

As to the table operating pusher motor 144, this motor is controlled by the valve 146 and said valve is controlled by solenoids S′ and T′ normally open switches SW–1 and SW–2 and cut out switches 235, and 237, FIGURES 5 and 17. Batteries U′ and V′ provide the electrical power in the circuits including these latter solenoids. The switch SW–1 is controlled by a mechanism, only a brake shoe grabbing claw 239, FIGURE 2, and a normally open safety switch SW–x of which is shown, operable in synchronization with the operation of the above described mechanism, for removing one at a time, the devices, say brake shoes, carried by the full tote boxes fed from the conveyor portion 32; and, as previously described, the switch SW–2 is closed, FIGURE 5, when the pusher motor has completed its pusher operation, that is the piston of said motor has reached the end of its operating stroke. The operative path of the claw 239, no claim to which is made, is diagrammatically disclosed in FIGURE 18.

Describing now the operation of the above described brake shoe carrying claw mechanism and the tote box manipulating mechanism, it will be assumed, as is disclosed in FIGURE 3, that the elevator 111 is in its up position and loaded with a full tote box 19 to be emptied of its brake shoes; and it will also be assumed that the claw mechanism 239 is at its start and finish position indicated by the letters SF in FIGURE 18. A normally open safety switch, SW–x, in the electrical controls for controlling the claw mechanism is then open; for this switch, as is disclosed in FIGURES 2 and 3, is closed by the elevator 111 when the latter is in its down position. It follows therefore that the claw mechanism can only work when the elevator is in its down position. The switches SW–5 and SW–6 are now closed, inasmuch as the elevator is in its up position and the full tote box is positioned on said elevator; and the switches SW–1, SW–2, SW–3 and SW–4 are open, the switches SW–7 and SW–8 are closed, and the table 140 is in its retracted position.

The attendant then closes the electrical control circuit for the claw operating mechanism and closes the cut out switches 231, 233, 235, and 237 in the circuits controlling the motors 130 and 144; and this operation, with the mechanism positioned as stated above, results in an energization of the motor 130 to move the loaded elevator downwardly to place a loaded tote box on the table 140. Now when this is done the switch SW–x is closed whereupon the claw operating mechanism, not shown, operates to move the claw 239 in the direction of the arrows in FIGURE 18; and when the claw reaches its pick up position, indicated by the letters PU in this figure, it operates to remove the brake shoe at the extreme left end of the totte box, said shoe being indicated by the letters BS in FIGURE 3. The claw 239 then continues its journey, with the brake shoe held therein, until it reaches a point where it momentarily closes the switch SW–1; and this operation results in an operation of the valve 146 to effect an operation of the pusher motor 144 to index the table 140 to the left, FIGURES 3 and 5, the friction brake 184, FIGURE 5, preventing any overtravel of the tote box; and one of the automatically operable stops 148 operates to prevent a return or slide back movement of the tote box. The motor 144 is then operative to return the table 140 back to its starting position, it being remembered that the switch SW–2 is closed when the flange 180 strikes said switch; and the tote box is then in a position on the table ready to have a brake shoe B'S′, FIGURE 3, removed therefrom.

Now the claw 239 is, during the aforementioned operation, continuing its movement toward a depository indicated by the letters UL in FIGURE 18; and when the loaded claw reaches this position it unloads the brake shoe BS into said depository and then continues on its way to pick up the brake shoe B'S′ at position PU, FIGURE 18. The aforementioned operations are continued until all of the brake shoes are removed from the tote box and with the last tote box push off operation of the motor 144 the then empty tote box has been moved far enough to the left, FIGURE 3, to dip down in a counterclockwise direction. Explaining this operation, the second of the indexing operations of the table 140 will move the tote box far enough to the left to close the switch SW–3 a portion of said box then resting on say an end roller R′. With the last indexing operation of the table 140 the center of the tote box passes beyond a balance roller BR, FIGURE 3, whereupon the aforementioned dipping operation takes place and the box then rolls, by the action of gravity, down the conveyor 34 and clear of the table 140. In the latter operation the switch SW–4 is closed, thus completing the electrical circuit including the solenoid T. The motor 130 is then energized to move the elevator upwardly to obtain another full tote box and in this operation the switch SW–x is automatically opened to temporarily disable the claw operating mechanism which has then reached say its SF start position.

Now just before the elevator 111 reaches its uppermost position, the inner end of the same contacts an end portion 238 of a U-shaped tote box escapement member 241, FIGURE 3, pivotally mounted at 243 on the sides of the conveyor portion 32. This member is provided with a cross bar 245 intermediate its ends, said bar, as disclosed in FIGURE 3, serving to stop a rightward, gravity propelled movement of the loaded tote boxes. When the escapement member is angularly rotated to the dotted line position, FIGURE 3, the full tote box slides down the conveyor, under the bar 245, and onto the rails 128 of the elevator 111. The switches SW–5 and SW–6 are at this time closed, the switch SW–5 being closed when the elevator is in its uppermost position, and the switch SW–6 when the full tote box is in place; whereupon the motor 130 is operative to lower the loaded elevator thus completing the cycle of operation of the claw operating and tote box manipulating mechanism. As a safety feature, when the conveyor portion 34 is full with empty boxes the switches SW–7 and SW–8 are both opened thereby temporarily disabling the entire mechanism; for the full elevator cannot then return to the table 140; and until it returns the claw mechanism cannot operate.

Figure 15:
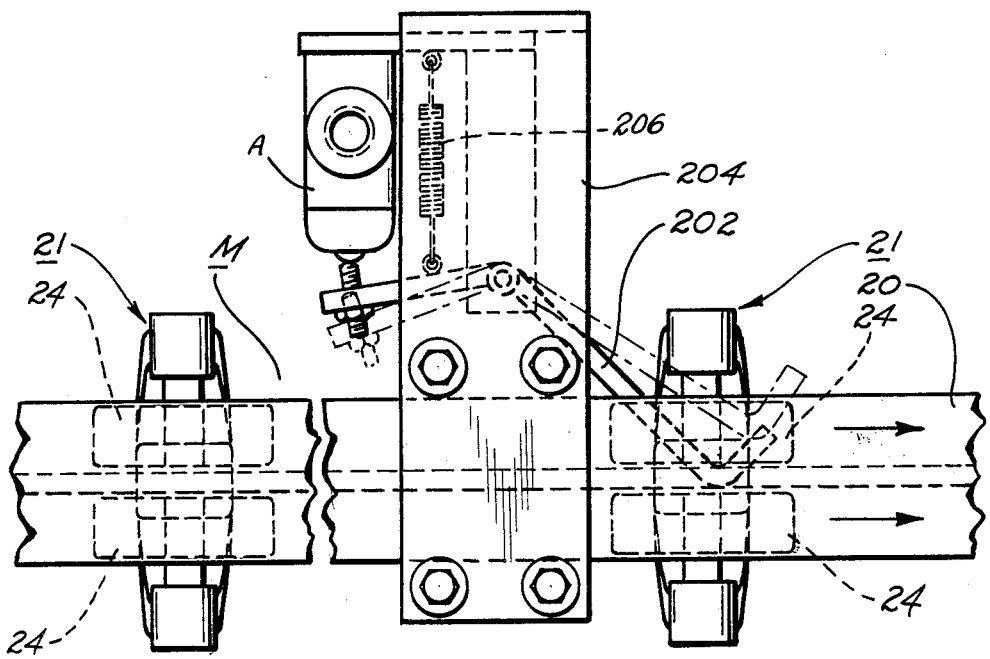
FIGURE 15 is a view disclosing details of the mechanism for actuating one of the switches of the controls for the elevator of the loader, unloader unit of our invention.

Describing now the control means for the loader, unloader mechanism of our invention, that part of the control for controlling the energization of the elevator unloader mechanism will now be described. Referring to FIGURE 16 of the drawings somewhat diagrammatically disclosing the controls for one of the loader, unloader mechanisms, the unloader elevator operating the motor 44 is controlled by the valve 46. This valve is controlled, in part, by two solenoids indicated by the letters E and F the motor 44 operating to move the elevator up when the solenoid F is energized as indicated by the arrow in FIGURE 16. The solenoid E is electrically connected in series with the aforementioned switch D, a normally closed switch A mounted on a bracket member 204, FIGURE 15, a cut out switch 201 and a battery G. The switch A is disclosed in FIGURE 15 and is actuated by a lever member 202 mounted on the bracket member 204 which is adjustably mounted on the I-beam 20 of the monorail conveyor M. As to the operation of the switch A, a portion of the trolley of each carrier 1 to 8 inclusive and a like portion of the trolleys a to b inclusive, FIGURE 1, strikes one end of the lever 202 as the carrier and trolleys move in the direction of the arrows in FIGURES 15 and 16; and this operation serves to rotate the lever, against the action of a return spring 206, to move the switch operating end of the lever away from the switch. The normally closed switch A is thus permitted to close; however, after the trolley has passed by the lever end the spring 206 operates to actuate the lever to again open the switch.

Figure 14:
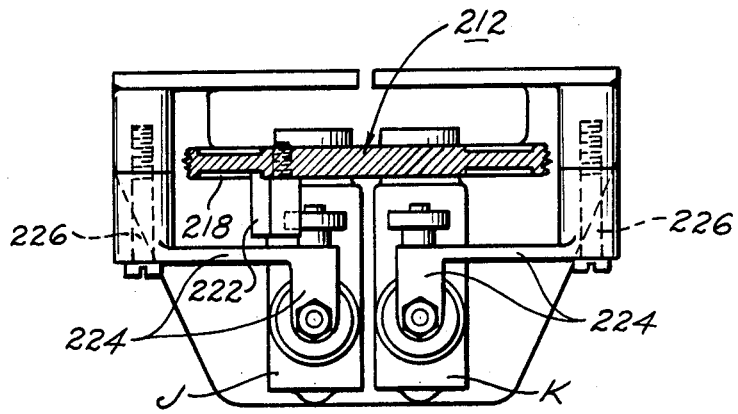
FIGURE 14 is a sectional view, taken on the line 14—14 of FIGURE 12, disclosing other details of the counter unit.

The solenoid F is electrically connected in series with a battery H, a cut out switch 207, a normally closed safety switch 203, FIGURE 19, opened, to momentarily disable the up operation of the several elevator motors 44, by a full tote box 19 as it just about reaches the counters 1a to 8a inclusive, a normally open safety switch C, FIGURE 9, and a switch J constituting part of a counter unit 208 disclosed in detail in FIGURES 12, 13 and 14. This counter unit is adjustably mounted for reasons explained hereinafter. The switch C, included to prevent an upward movement of the elevator 42 when said elevator is empty, is mounted on one end of the conveyor portion 97; and the bottom of the empty tote box 19 seated on the portion 97 serves to depress a spring loaded roller 81 connected to the switch. Thus, when the elevator mechanism is loaded with an empty tote box the switch C is closed thereby making possible an upward movement of the elevator. The counter mechanism per se constitutes no part of our invention inasmuch as the same is disclosed and claimed in U.S. application for patent, No. 649,136, filed March 28, 1957, now Patent No. 2,846,144. Suffice it to say here that this counter mechanism includes a pawl 210 and ratchet 212 actuated by an arm 214, this mechanism, and switches J and K controlled thereby, being housed within a casing 216 adjustably mounted on the conveyor M as disclosed in FIGURE 13. The ratchet 212 is recessed at 218 at its outer periphery; and said recess is provided with 16 equidistantly spaced openings 220 to receive fastening means for switch operating knob members 222, one for each counter 208. The knob 222 strikes a switch operating lever member 224 pivotally mounted at 226. As with the operation of the above described switch A, the moving trolleys a to h inclusive and carriers 1a to 8a inclusive strike the ratchet operating member, that is the arm 214; and this operation serves to rotate the switch operating ratchet, there being one increment of rotation of said ratchet effected by each trolley and carrier as it passes by the counter. As will be described hereinafter the switch J is closed by the passing of every 16th trolley, say a trolley b, FIGURE 12. As will be described this trolley is part of the control mechanism for handling a certain part to be fed into the assembly mechanism. A switch K, to be referred to hereinafter, is positioned adjacent the switch J; and this switch K is closed by the carrier, indicated by the numeral 2, following the trolley b of FIGURE 12.

Describing now the controls for the loader mechanism, that is the mechanism for transferring full tote boxes from the conveyor M to the conveyors 30′ feeding the assembly machines, the loader motor 36, FIGURE 16, is controlled by the valve 38 and said valve is, in turn, controlled by the solenoids L and N. The solenoid L is electrically connected in series with a battery O, a cut-out switch 211, the switch K and a normally closed safety switch P, the latter being opened, by a switch operating lever 83, when and only when a full tote box is seated upon the extreme end portion of the conveyor portion 32. Accordingly the loader motor 36 is temporarily inoperative to push a full tote box onto the conveyor portion 32 if and when said conveyor portion is at the time supporting a loaded tote box. The solenoid N, controlling the operation of the valve 38 to return the piston of the motor 36 to its off position, is electrically connected in series with a battery R, a cut-out switch 213, and the aforementioned switch B. There it thus provides means for automatically retracting the piston of the motor 36 to its off position after said motor has performed its operation of pushing a full tote box from the carrier onto the conveyor portion 32.

Describing the operation of the loader, unloader mechanisms when cooperating with the conveyors 30′ that feed the assembly mechanisms, it is to be remembered that in the embodiment of our invention disclosed in this application there are a plurality of trolley, carrier groups filling up the conveyor M, say twenty of said groups; and that each of said groups includes eight carriers operative to carry loaded and unloaded tote boxes; and that the trolleys, associated with said carriers and constituting a part of said group, are operative to actuate the several switches A. Now as is indicated by the loader, unloader units 1′ to 8′ in FIGURE 1 there are eight different articles, that is different parts of the automotive brake, being fed into the assembly mechanisms; and each of said loader, unloader units includes a counter. In the embodiment disclosed in FIGURE 1 there are within a bracket S′, a plurality of certain of these loader, unloader units; two of the units being numbered 6′ and two of the mechanisms being numbered 2′; however, an explanation of this will be given hereinafter, the full tote boxes carrying the eight different articles are successively, and in a certain sequence which may be varied at will, fed onto the conveyors 30′, the desired sequence and the desired location of the several operations being governed by the particular requirements of the assembly mechanisms. This sequence is determined by the particular setting of the counters.

For example, to explain the operation of the counter mechanism it will be assumed that a trolley h, FIGURE 1, is, with the mechanism at a standstill, positioned as disclosed in FIGURES 12 and 16, that is immediately adjacent the switch J of the counter of the loader, unloader 8′. The carrier 8 is then positioned adjacent a switch A located between the counters of the loader, unloader units 8′ and 7′. Now as is disclosed in FIGURE 16 the trolley of the carrier 8 is, at this time, positioned just beyond the lever for operating the latter switch, said lever being positioned slightly to the right of a point half-way between the counter of the loader, unloader 7′ and the counter of the loader, unloader 8′. All of the switch operating levers 202 of the mechanism of our invention are likewise positioned just a bit off center; and it is assumed for the purpose of this discussion that the conveyor M is traveling in the direction of the arrows in FIGURES 1 and 16. Carrier 8′, FIGURE 1, is, at the time, that is with the mechanism at a standstill, loaded with, say a Ford brake shoe of a brake unit being assembled. The trolley g, FIGURE 1, is positioned adjacent the ratchet arm of the counter for the loader, unloader 7′. As to the operation it follows, from the above, that with the conveyor in motion the elevator 42 with its empty tote box will go up when the trolley h operates the switch J of the counter of the loader, unloader unit 8′; then when the trolley g operates the switch A said elevator will start down just before the motor 36 operates to push the full tote box off of the carrier 8, the latter operation resulting from the carrier 8 operating the counter of said unit 8′.

As to the loader, unloader units 1a to 8a inclusive, cooperating with the supply source 18, these units duplicate the units 1′ to 8′ in structure with the exception that the members 100 and 102 of the unloader elevator mechanism may be say a few inches longer than the corresponding parts of the mechanisms 1′ to 8′; for such a structure will decrease the piston travel of the motor 44. It is also to be noted that the operation of the loader and unloader units 1a to 8a inclusive is the reverse of the loader, unloader mechanism 1′ to 8′ inclusive; and that the inclination of the conveyor portions 32 and 34 is the reverse. Concerning the inclination of the conveyor chute portion 32 the gravity propelled movement of tote boxes 19 down said chute is slowed up by a bellows type check unit 247 mounted on the end of one arm of a three armed lever 249, FIGURE 7. This lever is pivotally mounted on the upper end of a two part support 251 mounted on the portion 32. As to the aforementioned reverse operation in the units 1a to 8a, the empty tote boxes conveyed to the source 18 are pushed off of the lower basket of the carriers onto the conveyor portion 34; and loaded tote boxes are transferred, by the elevator mechanism, from the conveyor portion 32 to the top baskets of the carriers. The counters of the loader, unloader units 1a to 8a are set to effect the desired sequence of operations, preferably say a sequential 4a, 2a, 6a, 8a, 5a, 3a, 7a, 1a, operation. As indicated by the numbering of the loaded carriers in groups F' and H' the operation of the units 1a to 8a is such that the parts being processed are positioned in a certain order on each of the 20 groups of carriers. In the embodiment of our invention disclosed herein this order is 1, 2, 3, 4, 5, 6, 7, 8.

Describing the setting up of the mechanism of our invention the carriers, trolleys, adjustably mounted counters, levers 202, switches A and all other parts of the mechanism controlling the processing of the tote boxes are, with the mechanism at rest, positioned to effect the desired sequence of operation of the units 1' to 8' inclusive and 1a to 8a inclusive of FIGURE 1, the ratchet of each of said counters being placed in its necessary setting. For example, the ratchet of the counter for processing a brake cylinder part is set so that the knob 222 of said counter will, after the conveyor M is placed in operation, close the switch J after, say, four intermittent operations of said ratchet; and another ratchet will be set so that its knob will operate to close its switch J with the 8th operation of the ratchet. The mechanism may be set to effect, say an 8', 3', 7', 2', 6', 1', 5', 4' sequence, or any other desired sequence depending on the initial setting of the ratchets of the counters. It is to be remembered that each of the latter numbers indicates a different loader, unloader unit; and each of said units cooperates with a different tote box. Each tote box carries a different brake part. If desired, and as is disclosed in FIGURE 1 concerning the units 2', 6' and 8' of a plurality of loader, unloader units bracketed by the letters S' and P', the setting may be such that two or more loader, unloader units handling the same part will be operative. This is accomplished by setting the counters to cooperate with the conveyor; that is to say by timing the counter with the conveyor since there are twenty groups or sequences of 16 trolleys and carriers positioned around the circumference of the conveyor; and it is to be remembered that the counter is operative to close, say the switch J for every 16th operation of the ratchet. Only one of each of said duplicate units will be operative during any one sequential operation; the other unit will be operative with the next sequence that goes past the first of said duplicate units after its requirements for full tote boxes have been filled. Since the duplicate units are both in time with the same number in the sequence of parts being carried by the conveyor it can be readily seen that the first of any duplicate numbers requirements will have to be filled first; and after the first unit is filled the next duplicate line in the direction of travel of the conveyor will be filled next, etc. If the duplicate number is used a third time, the first and second requirements will have to be filled before the third unit will receive full tote boxes. The relative speeds of the assembly mechanisms and the conveyor M also affect the operation of the mechanism of our invention including the frequency of operation of the loader, unloader units; for it is to be remembered that the switch P, open when a full tote box is positioned on the end of the conveyor portion 32, prevents an operation of the motor 36 when said switch is open.

The conveyors 30' will probably, after say two sequential operations of the units 1' to 8' inclusive, build up a bank of the loaded tote boxes that is one or more of the conveyors 30' will be full of full tote boxes. In this event there will be a temporary discontinuance of the aforementioned sequential operation.

Reviewing now the complete operation of the loader, unloader units 1a to 8a inclusive and 1' to 8' inclusive, and their cooperation with the several conveyors of our mechanism, it will be assumed, for the purposes of this description and with the setting of the parts indicated above, that (1) each of the 8 carriers 1 to 8 inclusive handles a certain type of brake part, (2) said carriers are spaced by 8 switch operating trolleys a to h inclusive, said trolleys and carriers serving to make up one group of operating parts, (3) the monorail conveyor M is completely filled with a plurality of said groups of carriers and trolleys and, as indicated above in describing the operation of the carrier 8, that the counters of the units 1' to 8' of FIGURE 1 are positioned oppositely or substantially opposite the trolleys immediately ahead of the carriers 1 to 8 which correspond to said units 1' to 8', (4) the eight loader, unloader units 1' to 8' inclusive and 1a to 8a inclusive operate, for a given setting of the parts, to successively and in at least for one revolution of the conveyor M in the aforementioned sequences, to handle the loaded and unloaded tote boxes carrying the 8 different brake parts, (5) the carriers, from the unit 1a, FIGURE 1, around counterclockwise to the rightward unit 8' of the block of units P', are loaded with full tote boxes but devoid of empty tote boxes: that the carriers, going counterclockwise from the aforementioned rightward unit 8' around to the unit 4a are loaded with empty tote boxes and devoid of full tote boxes, (6) the loaded elevators 42 of the loader mechanism are in their down position as disclosed in FIGURE 16, the switches C being closed by an empty tote box, (7) the pusher motors 36 of the unloader mechanism are in their off, that is retracted position, (8) the switches P are closed, and (9) the loaded carriers are positioned as indicated in part in FIGURE 16, that is with the switches J of the counters of the loader, unloader units 8' to be closed with the initiation of movement of the conveyor M. In other words the units 8' are the first to be operated of the sequence 8', 3', 7', 2', 6', 1', 5', 4'; and as to the loader, unloader units 1a to 8a inclusive the sequence is 4a, 2a, 6a, 8a, 5a, 3a, 7a, 1a.

The cut-out switches 201, 207, 211, and 213, FIGURE 16 are then closed to make possible an energization of the loader, unloader mechanisms and the operation of the conveyor M is initiated by starting the motor, not shown, which drives said conveyor. Incidentally, in the description immediately following the operation of only one of the loader, unloader units, is described, say unit 8'; however, this description will serve for all of the loader, unloader units associated with the conveyors. The movement of the conveyor M results in a closing of the switch J of the counter of the unit 8', whereupon the solenoid F is energized to operate the valve number 46; and the latter operation results in an energization of the motor 44 to send the loaded elevator 42 upward to the full line position of FIGURE 9, the switch D being closed by this operation. In this operation the cam mechanism 108, 110 operates to angularly move the elevator platform 98 as described above.

The continued, that is next operative increment of movement of the conveyor M then results first in an operation of a lever 202 by the trolley g, FIGURES 1 and 16, to close the switch A operated thereby; and then immediately thereafter the trolley of the carrier 8 actuates the ratchet arm of the counter of the loader, unloader 8' to close the switch K of said counter. The closing of the latter switch A results in an operation of the solenoid E to again operate the valve 46; and the latter operation results in an energization of the motor 44 to move the elevator 42 with its tote box downwardly. The then empty lower basket of the approaching loaded carrier then slides under the tote box thereby removing it from the elevator and the latter continues its downward movement to subsequently receive, by the operation of gravity, another empty tote box from the conveyor portion 34. As the elevator approaches its lowermost position, the base portion of the end flange structure 99 of the elevator strikes a flange 223, FIGURE 9, of a spring loaded U-shaped stop member 225; and moves said member downwardly. This member is biased upwardly by a spring 227 to the full line position disclosed in FIGURE 9, and in this position serves to prevent an empty tote box from rolling onto the end of the conveyor when the elevator is in its up position. A spring loaded stop 229, biased upwardly by a spring, not shown, and mounted on one of the angle iron sides of the conveyor, serves to prevent the tote box from rolling backward after it bumps the end of the platform portion 97.

The closing of the switch K, immediately after the closing of the switch A, results in an operation of the solenoid L; and this operation results in an operation of the valve 38 to energize the motor 36, the power element thereof pushing the loaded tote box off of the upper basket of the carrier and onto the conveyor portion 32. The switch P is at the time closed, it being assumed that the conveyor portion 32 is not full of tote boxes. In this operation the curve of side rail portion 107, FIGURE 10, determines the path of the tote box as it moves onto the rollers 11. The power element of the motor 36 is, after this tote box push-off operation, immediately returned to its off position inasmuch as the closing of the switch B results in the operation of solenoid N operating to again operate the valve 38; and the latter operation results in an operation of the motor 36 to effect this return operation.

Continued movement of the conveyor M then results in completing the sequence of unloading and loading operations of the units 8', 3', 7', 2', 6', 1', 5' and 4' to feed the conveyor portions 32 with the remaining brake parts of the groups of parts being transferred from the conveyor M, and to remove the empty tote boxes from the conveyor portion 34 placing them on the latter conveyor. As to loader, unloader units 1a to 8a inclusive these units are operated concurrently with the operation of the units 1' to 8' inclusive but in a different sequence as described above.

Completing the discussion of the processing of the tote boxes the conveyors 36', having been filled with full tote boxes, are then operative, by gravity, to transport said boxes to points near the assembly machines whereupon said boxes are, by the tote box manipulating mechanism discussed above, emptied of their contents and then transferred, by the claw 239 and other mechanisms, not shown, to the assembly machines. The brake parts are then, together with other hopper fed brake parts, assembled to make up the complete brake units. The empty tote boxes on the conveyors 30' are then returned to the unloader units 1' to 8' and are then, in the aforementioned sequence 8', 3', 7', 2', 6', 1', 5', 4', transferred to the conveyor M.

There is thus provided, by the mechanism of our invention, means, requiring a minimum of manual labor, probably only one man, for effectively transporting, from a storage source to an assembly machine, parts to be employed by said machines in the assembling of a unit such as an automotive brake. With the mechanism of our invention the attendant, after the mechanism is set up and the conveyor M is put in motion, knows the order of the several different processed parts of each group of parts approaching the loader, unloader units 1' to 8' inclusive; and this is an important feature of our invention for he may at any time, and dependent upon the needs of the assembly machine or machines as the case may be, change the relative location, and therefore the sequence of operation, of the several units 1' to 8'. The attendants knowing the exact order of the approaching parts, say a Chevrolet front brake shoe and next a Cadillac brake cylinder, will facilitate his setting up of the counters of the loader, unloader units as desired. Accordingly, the order of recepit and the location of the parts received may be varied at will; and upon receipt of said parts they may then be disposed of as desired. With the embodiment of our invention disclosed in this application the parts processed are assumed to be parts of an automotive brake however the handling mechanism of our invention is not to be so limited; for the processed parts may be, say wearing apparel to be transported from a certain source to a plurality of depositories.

While the preferred embodiment of the invention has been described in considerable detail, we do not wish to be limited to the particular construction shown which may be varied within the scope of the invention, and it is the intention to cover hereby all adaptations, modifications and arrangements thereof which come within the practice of those skilled in the art to which the invention relates.

We claim:

1. The combination with a monorail type of conveyor mechanism comprising a plurality of movable carriers each including a hanger member mounted on a movable portion of the mechanism, said carriers serving to transport from place to place container members mounted thereon, of a plurality of roller conveyor mechanisms mounted alongside the monorail conveyor mechanism, a loader mechanism including motor means movable into and out of engagement with said container members mounted at one end of each of the roller conveyor mechanisms and operative to transfer the container members from the monorail conveyor to the roller conveyor mechanisms, electrical means, including switches operated by the carriers for effecting energization of said motor means to selectively transfer certain of said container members from said monorail conveyor to certain of said roller conveyor mechanisms, a plurality of unloader mechanisms including motor means mounted at one end of the conveyor mechanisms and operative to transfer empty carrier members from the second mentioned conveyors to the monorail conveyor, and electrical means, including a plurality of switches actuated by the carrier members for energizing said motor means in a predetermined sequence relative to the energization of said first named motor means.

2. The combination with a monorail type of conveyor mechanism comprising a plurality of movable carriers each including a trolley member mounted on a movable portion of the mechanism, said carriers serving to transport, from place to place, container members mounted thereon, of a plurality of conveyor mechanisms mounted alongside and extending normal to the monorail conveyor mechanism, a plurality of power operated loader mechanisms, one of said mechanisms mounted at one end of each of the conveyor mechanisms and operative to transfer the container members from the monorail conveyor to the conveyor mechanisms, electrical means, including a plurality of switches operated by the carriers for in part controlling the operation of the loader mechanisms, a plurality of power operated unloader mechanisms mounted at one end of each of the conveyor mechanisms and operative to transfer empty carrier members from said mechanisms to the monorail conveyor, and electrical means, including a plurality of switches actuated by the carrier members, for in part controlling the operation of the unloader mechanisms.

3. The combination with a monorail type of conveyor mechanism comprising a plurality of movable carriers each including a trolley member mounted on a movable portion of the mechanism, said carriers serving to transport, from place to place, container members mounted thereon, of a plurality of conveyor mechanisms mounted alongside and extending normal to the monorail conveyor mechanism, a power operated loader mechanism mounted at one end of each of the conveyor mechanisms and operative to transfer the container members from the monorail conveyor to the conveyor mechanisms, electro pneumatic means, including a portion of a counter switch mechansim actuated by the trolleys, for in part controlling the operation of the loader mechanisms, a power operated unloader mechanism mounted at one end of each of the conveyor mechanisms and operative to transfer empty carrier members from the latter mechanisms to the monorail conveyor, and electro pneumatic means, including another portion of the aforementioned counter switch mechanism, actuated by the trolley members, for controlling the operation of the unloader mechanisms.

4. The combination with a monorail type of conveyor comprising a plurality of spaced carriers each including a trolley member mounted on a movable portion of the conveyor and further including a multi-trayed basket member, said carriers serving to transport, from place to place, a plurality of containers mounted on one of the trays of each basket, of a plurality of gravity type conveyors mounted alongside the monorail conveyor, a loader mechanism mounted adjacent one end of each of the gravity type conveyors and alongside the monorail conveyor and operable to push containers from the aforementioned trays of the carriers onto the second mentioned conveyors, switch means operable by the trolleys for in part controlling the operation of the loader mechanisms, a plurality of unloader mechanisms mounted beneath the monorail conveyor and adjacent one end of the gravity type conveyors and operative to transfer empty containers from the latter conveyors to a certain tray on the basket members of the monorail conveyor, and switch means actuated by the trolleys, for controlling the operation of the unloader mechanisms.

5. The combination with a monorail type of conveyor comprising a plurality of groups of movable and spaced carriers, there being the same number of carriers in each group and each carrier including a trolley member mounted on a movable portion of the conveyor and further including a multi-trayed basket member, said carriers serving to transport, from place to place, a plurality of containers mounted on a certain tray of the baskets, of a plurality of conveyors mounted alongside and extending normal to the monorail conveyor, a separate loader mechanism including switching means adapted to be engaged by said trolley members mounted adjacent one end of each of the latter conveyors and extending normal to the monorail conveyor, said loader mechanisms being energized in a first predetermined sequence in response to engagement of certain of said trolley members with said switching means, to push containers from the basket members of the several groups of carriers onto the latter conveyors, each group being operated in said first predetermined sequence; switch means operable by certain of the trolleys for in part controlling the operation of the several loader mechanisms to effect the latter sequential operation, an unloader mechanism mounted beneath the monorail conveyor and adjacent one end of each of the latter conveyors and operative in the aforementioned sequential operation to transfer empty containers from the latter conveyors to certain trays on the basket members of the monorail conveyor, and switch means actuated by the trolleys for controlling the operation of the several unloader mechanisms.

6. The combination, with a source of supply and an endless conveyor for transporting like groups of containers from place to place the containers of each group each carrying a certain article, the several articles being different from each other, of a group of conveyors for handling said containers, said group of conveyors being located adjacent the supply source to facilitate the filling of the containers with devices to be processed, a group of loader, unloader units mounted adjacent the latter conveyors and operable, depending upon their setting, to, successively and in a first determined order, load the endless conveyors with full containers transferred from the group of conveyors, the containers being then positioned on the endless conveyor in said first predetermined order, and also operable to transfer, in said first predetermined order, empty containers from the endless conveyor to said group of conveyors; together with another group of conveyors for handling said containers and another group of loader, unloader units mounted adjacent thereto and operable, depending upon their setting, to, successively and in a second predetermined order, transfer full containers from the endless conveyor to the latter group of conveyors, and also operable, in the latter sequence, to transfer empty containers from the latter group of conveyors to the endless conveyor.

7. The combination, with a monorail conveyor including a plurality of container carrying carriers and switch operating trolleys mounted thereon, the carriers and trolleys alternating in their position on the conveyor, of two groups of loader, unloader units mounted adjacent the endless conveyor, said units each including an elevator unit and a pusher unit, two groups of conveyors associated with said loader, unloader units, and means for controlling the operation of the latter units in the operation of transferring containers from the endless conveyor to the groups of conveyors and transferring containers from the latter conveyors to the endless conveyor, said control means including counters operatively actuated by both the trolleys and carriers, and further including switches operatively actuated by only the trolleys.

8. The combination with a monorail conveyor including an endless track member and a plurality of container carrying carrier units and switch operating trolley units mounted on said track member, the carrier units and trolley units alternating in their position on the track member, of two groups of loader, unloader units mounted adjacent the endless conveyor, said units each including an elevator unit and a pusher unit, two groups of conveyors associated with said loader, unloader units, and means for controlling the operation of the latter units in the operation of transferring containers from the endless conveyor to the groups of conveyors and transferring containers from the latter conveyors to the endless conveyor, the elevator units being energized immediately before the pusher units are energized, said control means including counters adjustably mounted on the track member and operatively actuated by both the trolley units and carrier units, and further including switches adjustably mounted on the track member and operatively actuated by only the trolley units.

9. The combination, with a monorail conveyor including an endless track member and a plurality of container carrying carrier units and switch operating trolley units mounted thereon, the carrier units and trolley units alternating in their position on the track member, of two groups of conveyors operatively associated with the monorail conveyor, two groups of loader, unloader units mounted adjacent the monorail conveyor and including double acting elevator motors constituting a part of the unloader portion of the loader, unloader units, and means for controlling the operation of the latter units to effect the operation of transferring, by means including the motors, the loaded containers from one of the groups of conveyors to the endless conveyor and, also by the operation of said motors, transferring empty containers from the other group of conveyors to the endless conveyor, said control means including counter units operatively actuated by both the trolley units and the carrier units, and further including switches operatively actuated by only the trolley units.

10. The combination, with a monorail conveyor including an endless track member and a plurality of container carrying carrier units and switch operating trolley units mounted thereon, the carrier units and trolley units alternating in their position on the track member, of two groups of conveyors operatively associated with the monorail conveyor, two groups of loader, unloader units mounted adjacent the monorail conveyor and including double acting elevator operating motors constituting a part of the unloader portion of the loader, unloader units, and means for controlling the operation of the latter units to effect the operation of transferring, by means including the motors, the loaded containers from one of the groups of conveyors to the endless conveyor and, also by the operation of said motors, transferring empty containers from the other group of conveyors to the endless conveyor, said control means including counter units adjustably mounted on the track member and operatively actuated by both the trolley units and the carrier units, and further including switches adjustably mounted on the track member and operatively actuated by only the trolley units.

11. The combination, with a monorail conveyor including an endless track member and a plurality of container carrying carrier units and switch operating trolley units mounted thereon, the carrier units and trolley units alternating in their position on the track member, of two groups of conveyors extending normal to the track member and operatively associated with the monorail conveyor, two groups of loader, unloader units mounted adjacent the monorail conveyor and including double acting elevator motors constituting a part of the unloader portion of the loader, unloader units and means for controlling the operation of the latter units to effect the operation of transferring, by means including the motors, the loaded containers from one of the groups of conveyors to the endless conveyor and, also by the operation of said motors, transferring empty containers from the other group of conveyors to the endless conveyor, said control means including counter units each comprising two switches and each being adjustably mounted on the track member and operatively actuated by both the trolley units and the carrier units, and further including switches adjustably mounted on the track member and operatively actuated by only the trolley units.

12. The combination, with an endless conveyor adapted to transport parts carrying containers, of a plurality of spaced apart conveyors positioned adjacent the aforementioned conveyor, each of said spaced apart containers receiving containers carrying like parts and all of said spaced apart containers together receiving all of the parts carried by said containers, a mechanism, including a plurality of spaced apart conveyors and a plurality of loader and unloader mechanisms for successively supplying the endless conveyor with full containers and removing empty containers therefrom, a loader and unloader mechanism for each of the first mentioned spaced apart conveyors operative to transfer full containers from the endless conveyor to its associated one of said first memntioned spaced apart conveyors and then, after each of the full containers is emptied of parts, transfer the empty containers to the endless conveyor for return to said first named plurality of loader and unloader mechanisms for removal and refill of said containers, and means, including a counter mechanism actuated by said parts carrying containers and switch means operatively connected to the counter mechanism and said first and second named plurality of loader and unloader mechanisms, for causing said first named loader and unloader mechanisms to unload empty containers from and load full containers on said endless conveyor in a predetermined sequential order, said last named means being operative to cause said second named plurality of loader and unloader mechanisms to unload full containers from and load empty containers on said endless conveyor in a predetermined sequential order.

References Cited in the file of this patent

UNITED STATES PATENTS

| | | |
|---|---|---|
| 1,937,303 | Worrall | Nov. 28, 1933 |
| 2,348,112 | Da Costa | May 2, 1944 |
| 2,400,542 | Davis | May 21, 1946 |
| 2,466,650 | Walker et al. | Apr. 5, 1949 |
| 2,700,449 | Gleason et al. | Jan. 25, 1955 |
| 2,708,501 | Boehm | May 17, 1955 |
| 2,872,057 | Wagner et al. | Feb. 3, 1959 |